(12) United States Patent
Shekar et al.

(10) Patent No.: US 8,271,556 B1
(45) Date of Patent: *Sep. 18, 2012

(54) METHOD AND SYSTEM FOR MANAGING CLUSTERED AND NON-CLUSTERED STORAGE SYSTEMS

(75) Inventors: Raja Shekar, Bangalore (IN); Ravindra Kumar, Bangalore (IN); Kartik Kumar, Bangalore (IN)

(73) Assignee: Netapp, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/241,000

(22) Filed: Sep. 22, 2011

Related U.S. Application Data

(63) Continuation of application No. 12/561,592, filed on Sep. 17, 2009, now Pat. No. 8,051,113.

(51) Int. Cl.
*G06F 17/30* (2006.01)
*G06F 12/00* (2006.01)

(52) U.S. Cl. ........................................ 707/821

(58) Field of Classification Search ................ None
See application file for complete search history.

(56) References Cited

U.S. PATENT DOCUMENTS

| | | | |
|---|---|---|---|
| 2002/0175938 A1* | 11/2002 | Hackworth | 345/751 |
| 2003/0204583 A1 | 10/2003 | Kaneda et al. | |
| 2004/0243699 A1 | 12/2004 | Koclanes et al. | |
| 2005/0060125 A1 | 3/2005 | Kaiser | |
| 2005/0120160 A1* | 6/2005 | Plouffe et al. | 711/1 |
| 2005/0132212 A1 | 6/2005 | Haswell | |
| 2006/0045039 A1 | 3/2006 | Tsuneya et al. | |
| 2006/0136529 A1 | 6/2006 | Pudipeddi et al. | |
| 2009/0300173 A1 | 12/2009 | Bakman et al. | |

* cited by examiner

*Primary Examiner* — Syed Hasan
(74) *Attorney, Agent, or Firm* — Klein, O'Neill & Singh, LLP

(57) ABSTRACT

Method and system for managing a storage environment having a cluster based storage system and a non-cluster based storage system is provided. A management application collects information regarding components of both the cluster based storage system and the non-cluster based storage system. A layout having a plurality of data structures is generated and maintained by the management application. The data structures include information regarding the components and their relationships with each other, if any. The layout is used for responding to user requests and presenting an integrated view of the storage environment on a display device with selectable options for selecting the cluster based storage system components and the non-cluster based storage system components.

29 Claims, 32 Drawing Sheets

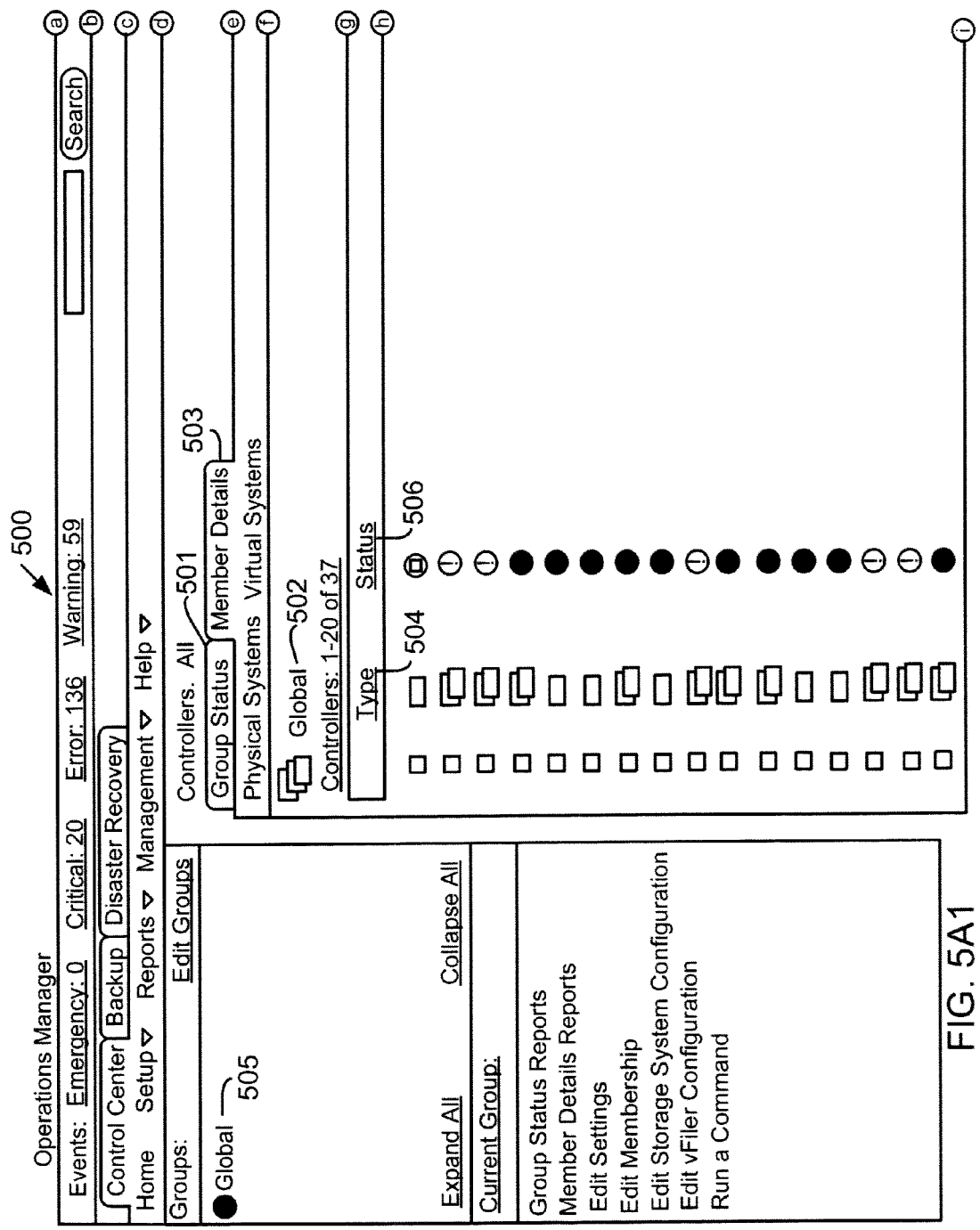
FIG. 5A1

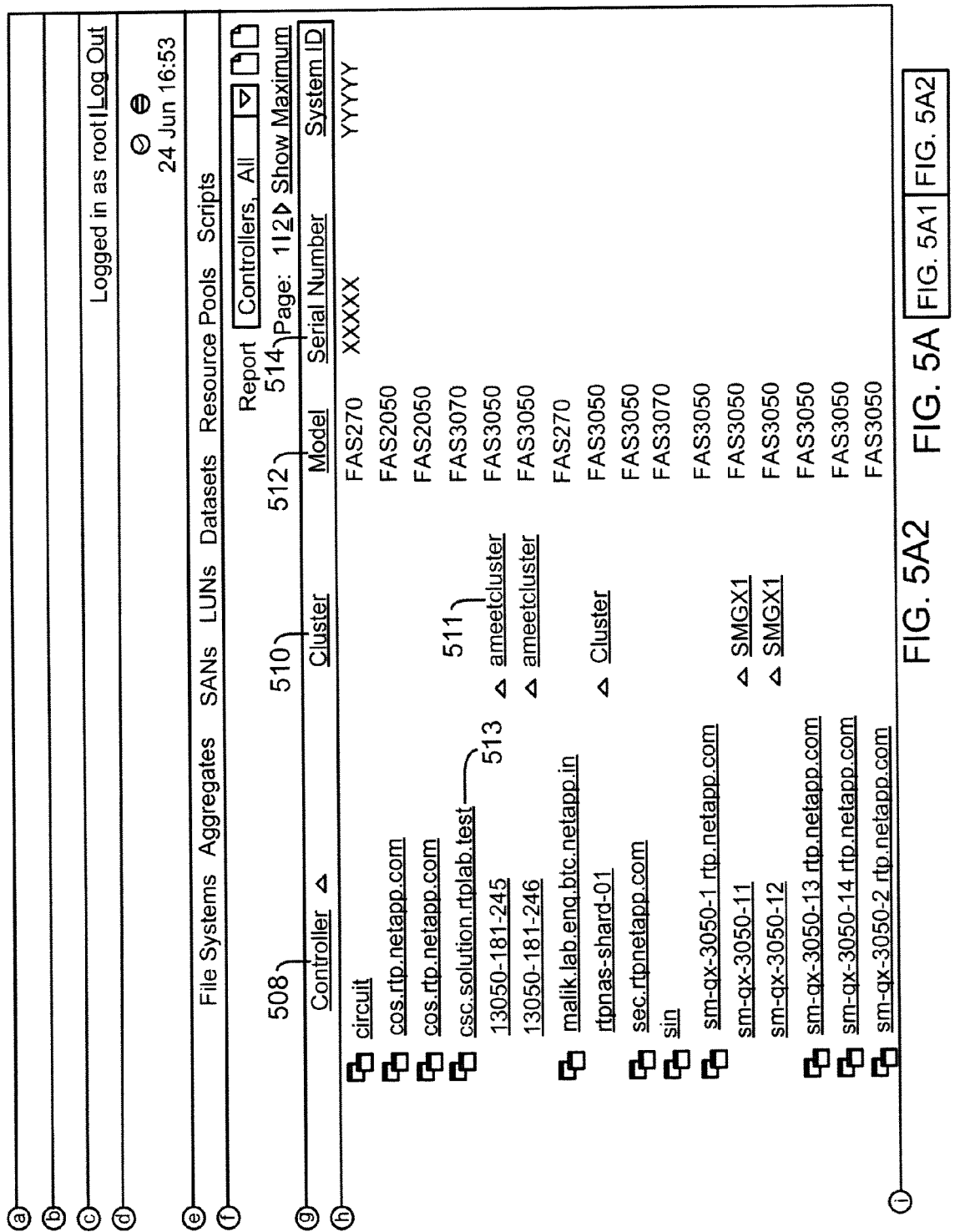

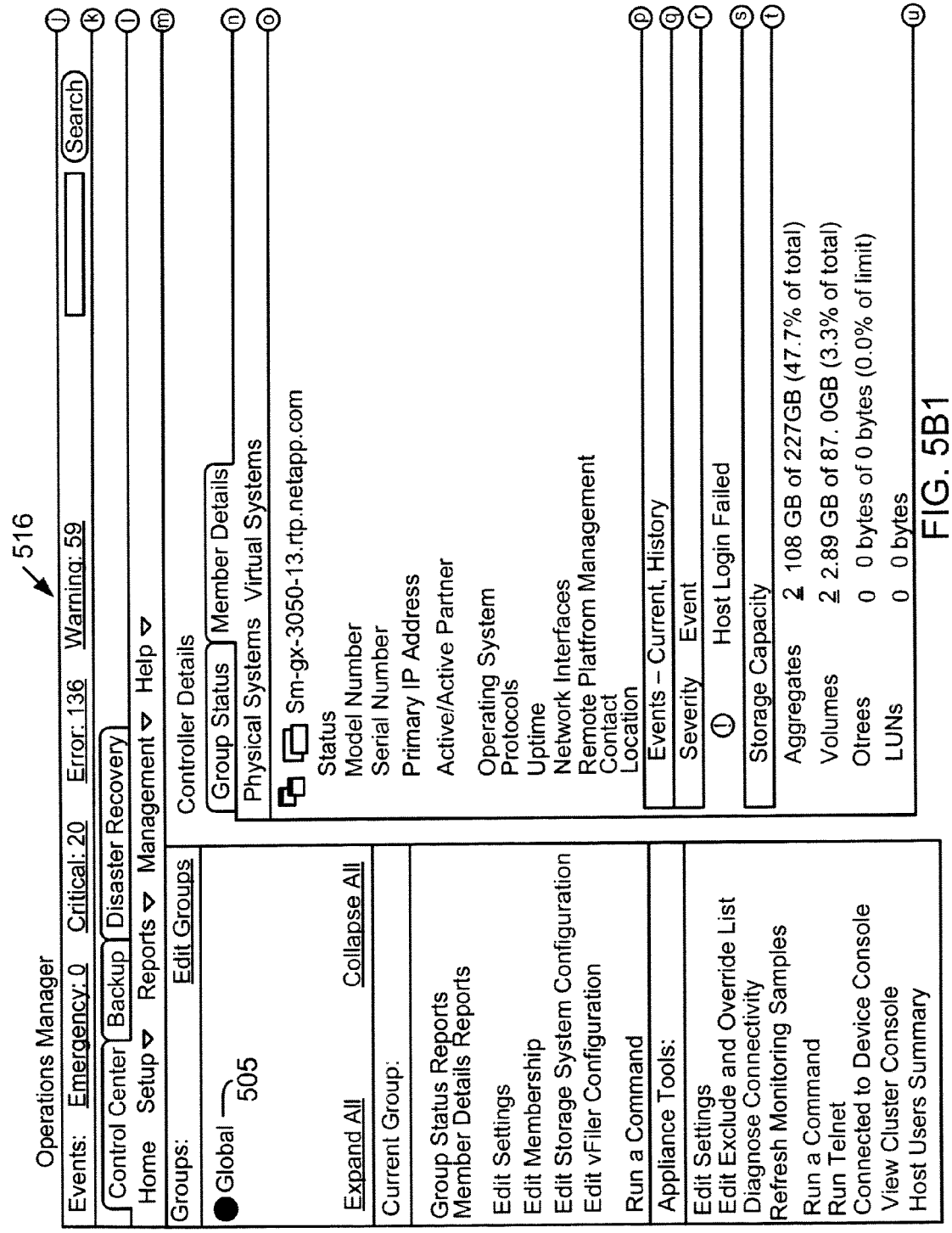
FIG. 5B1

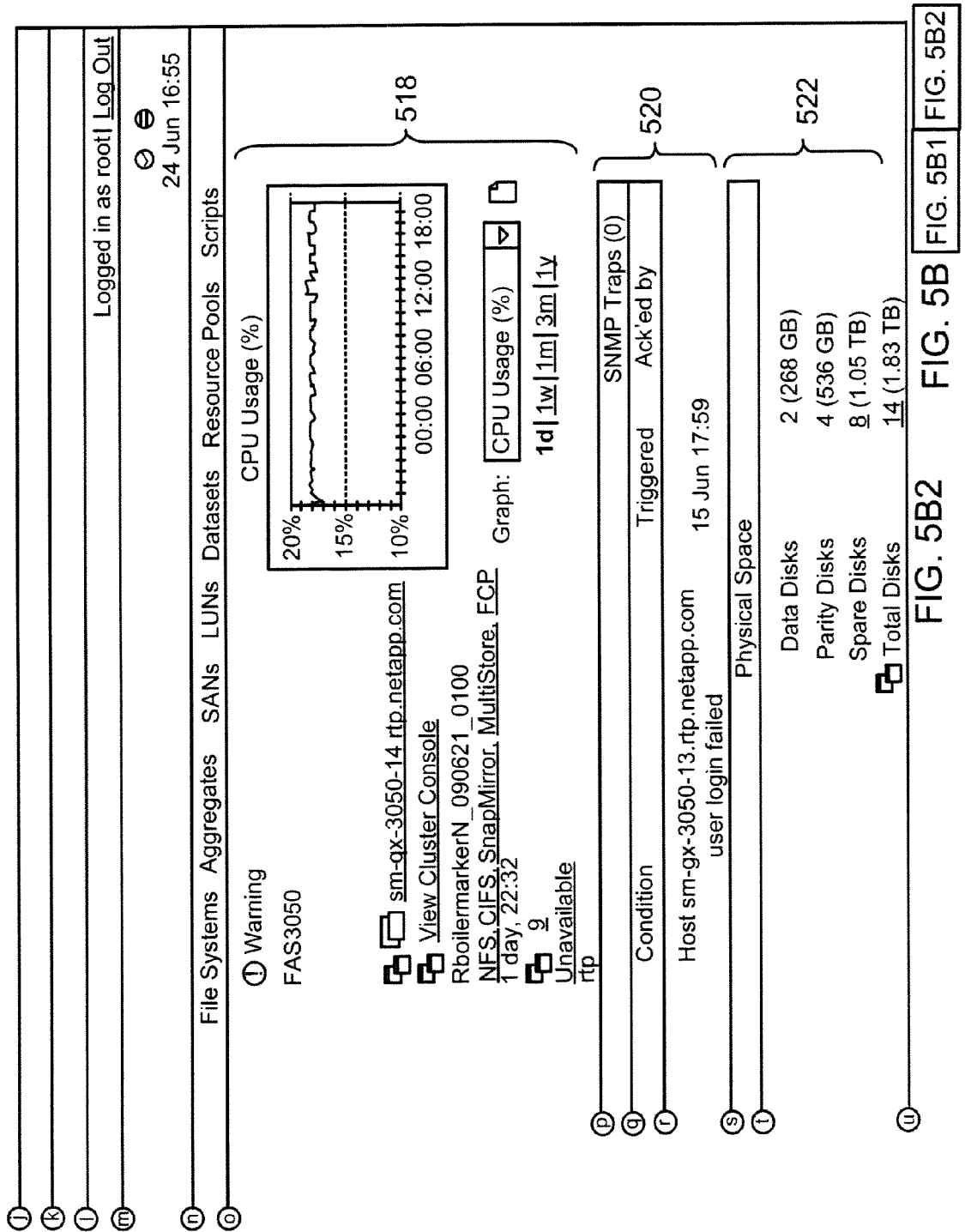

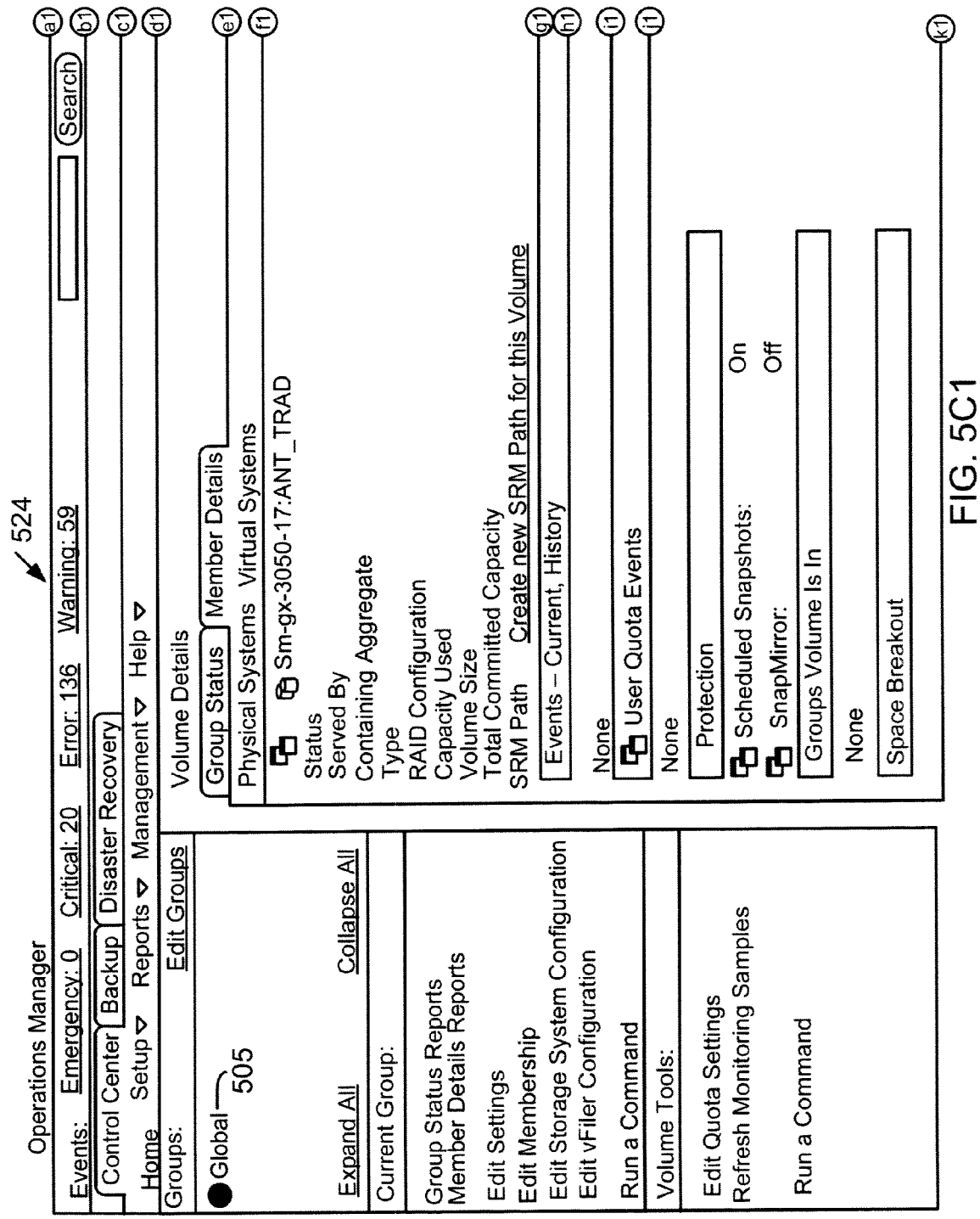
FIG. 5C1

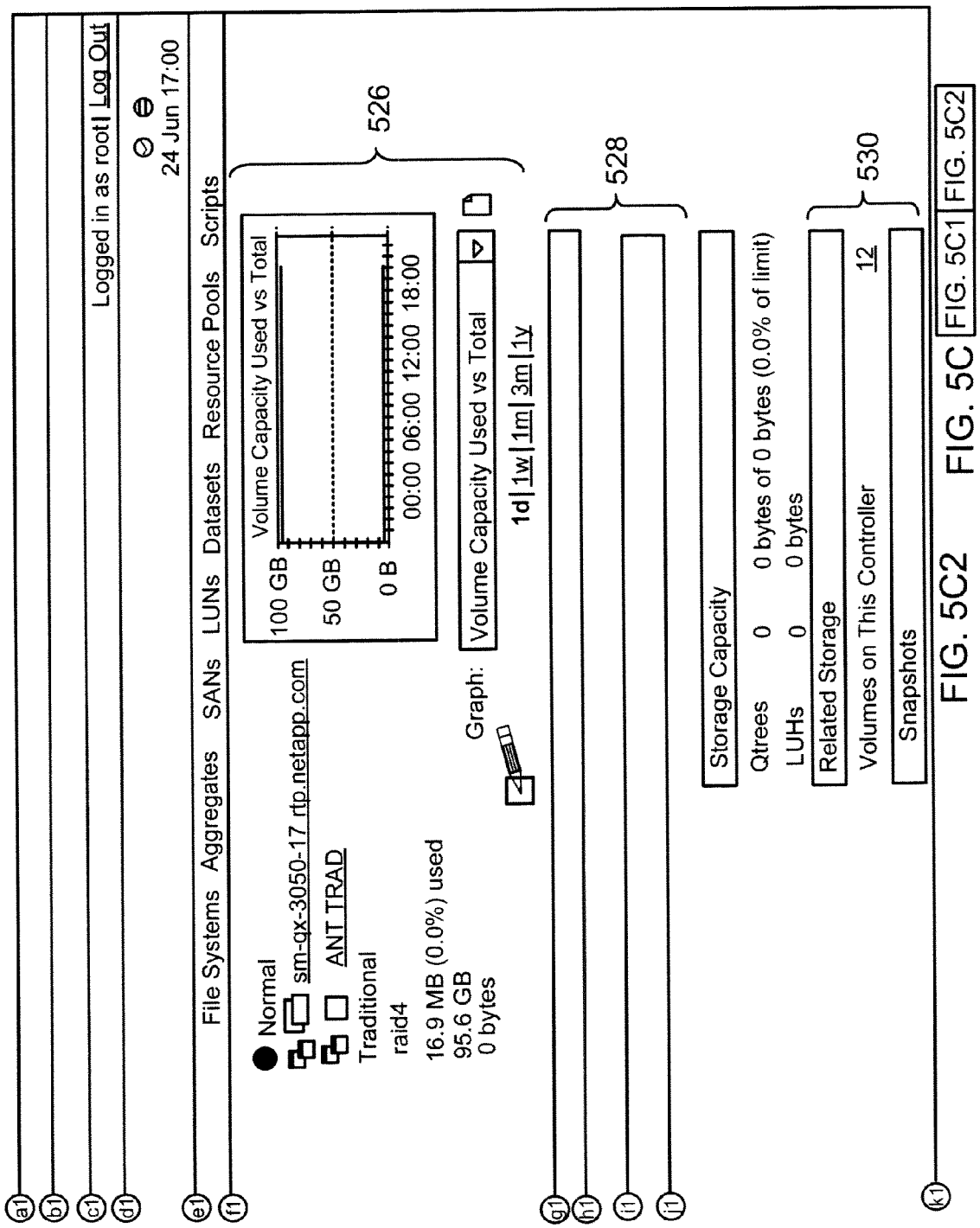

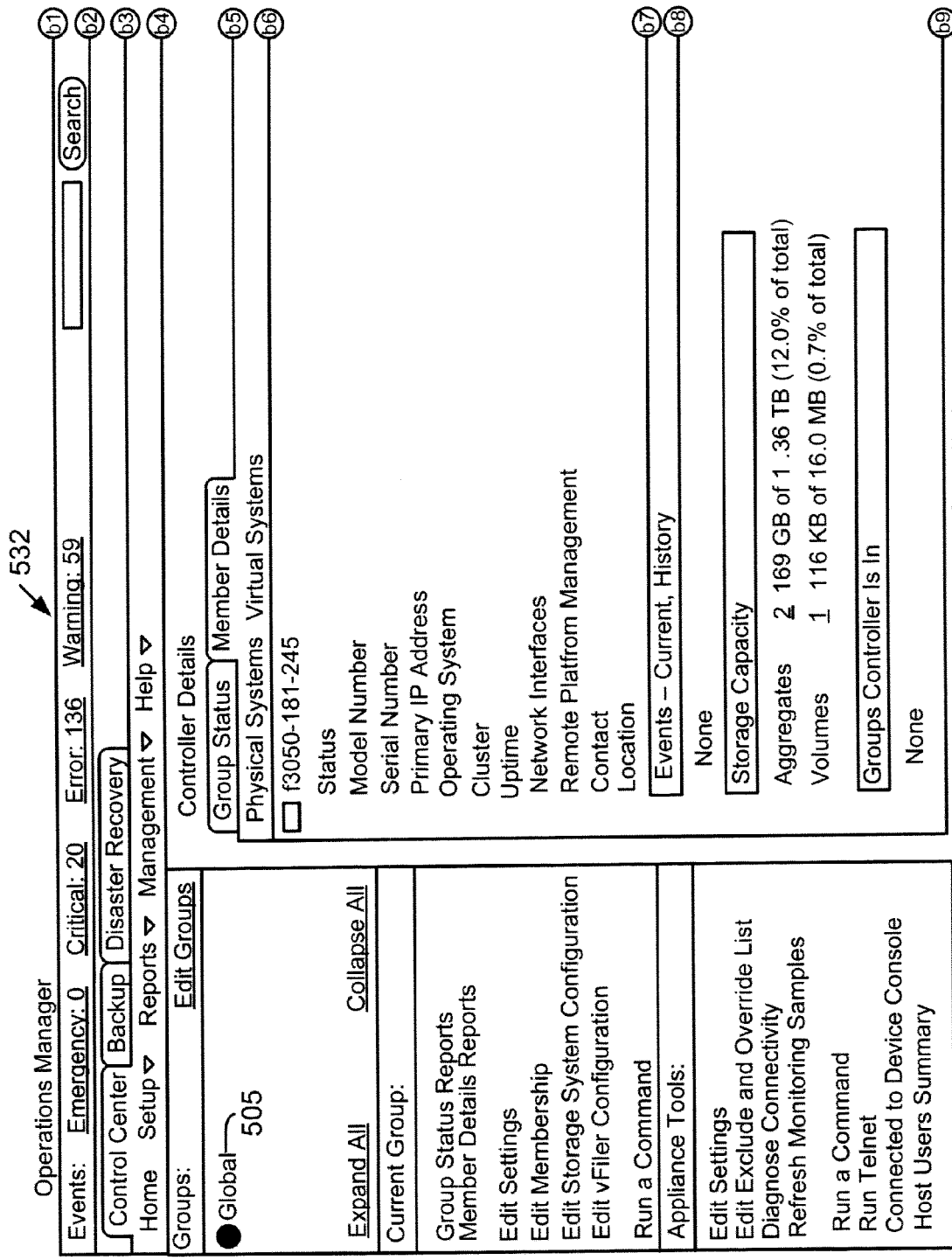
FIG. 5D1

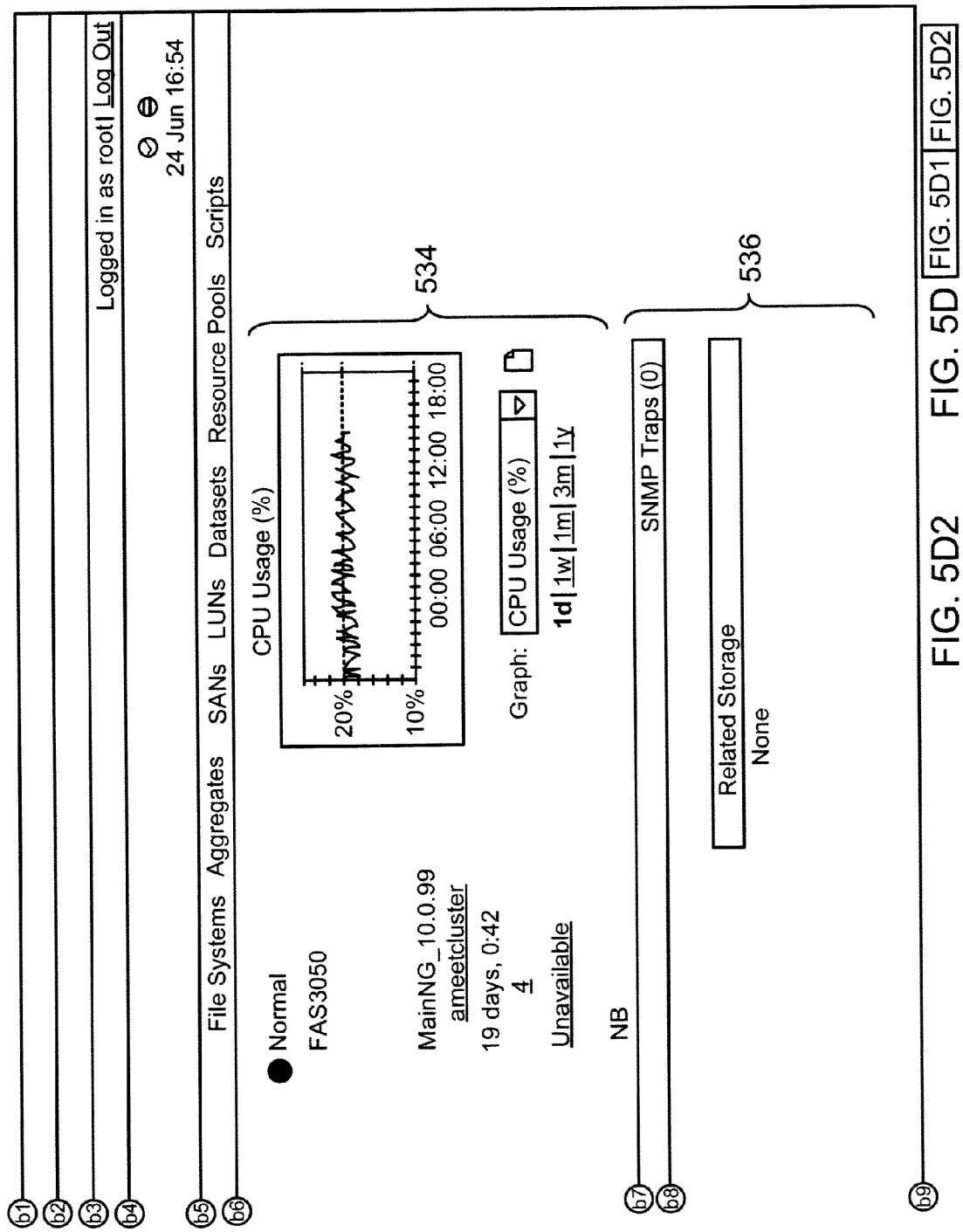

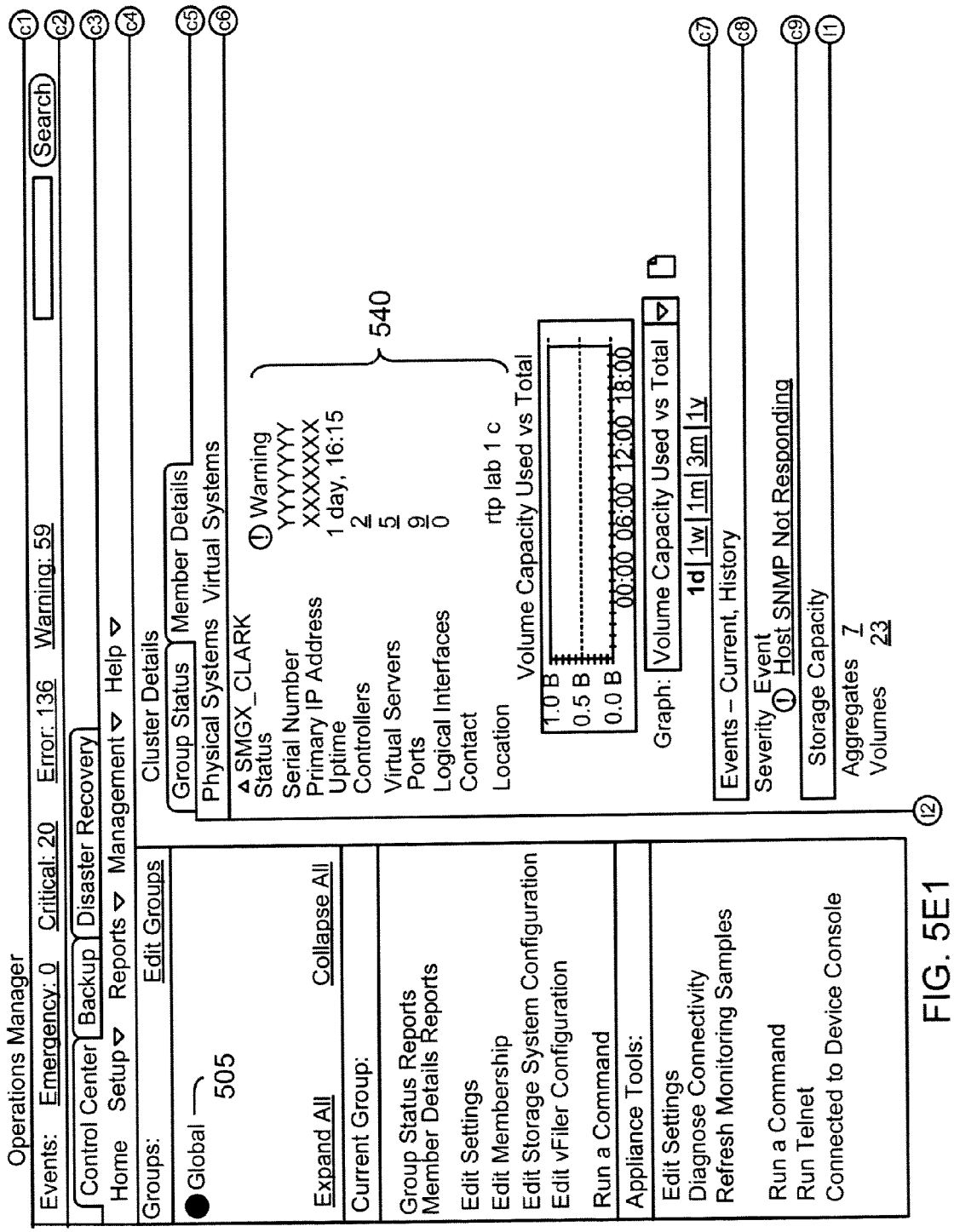
FIG. 5E1

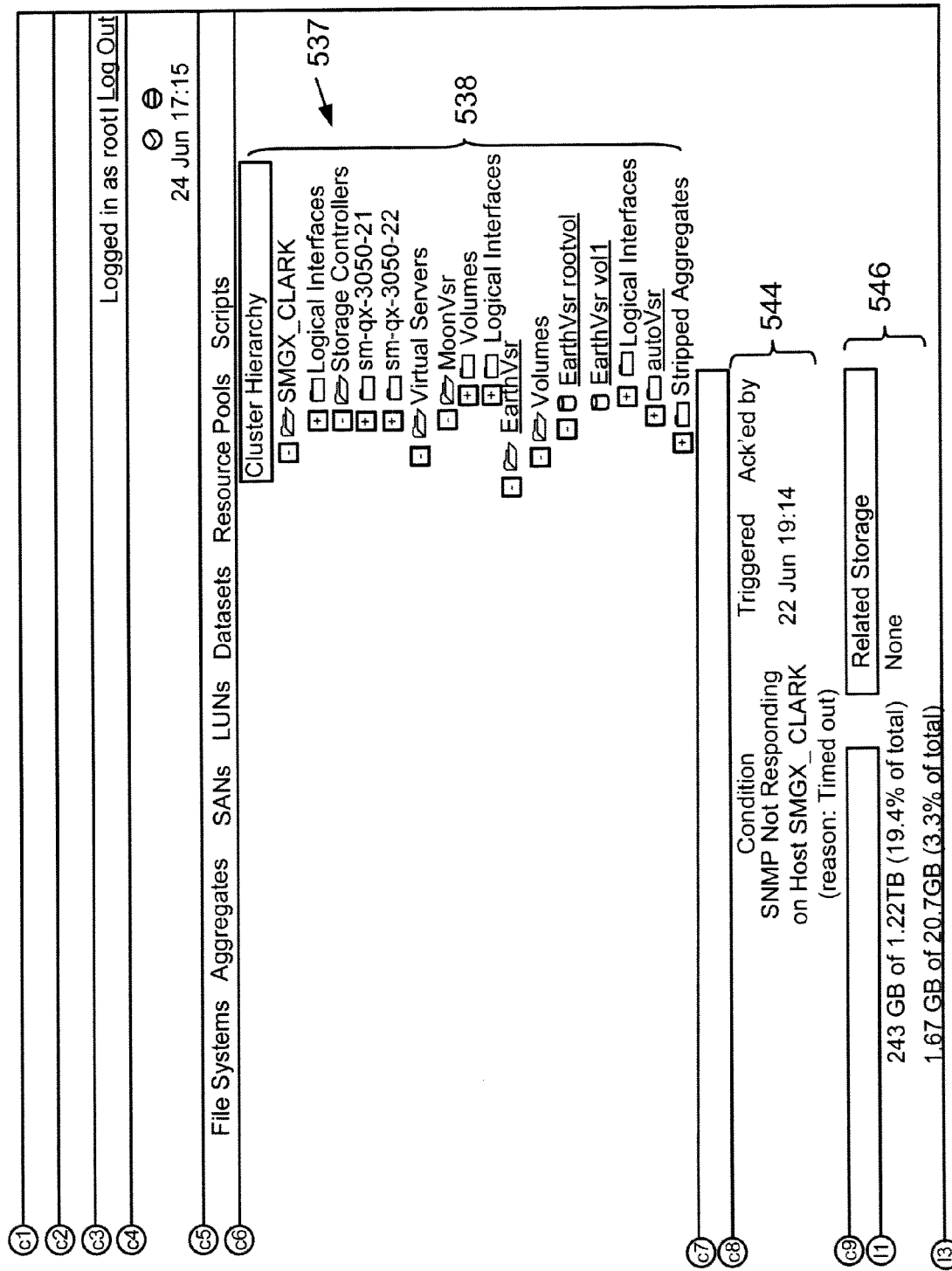
FIG. 5E2

FIG. 5E3

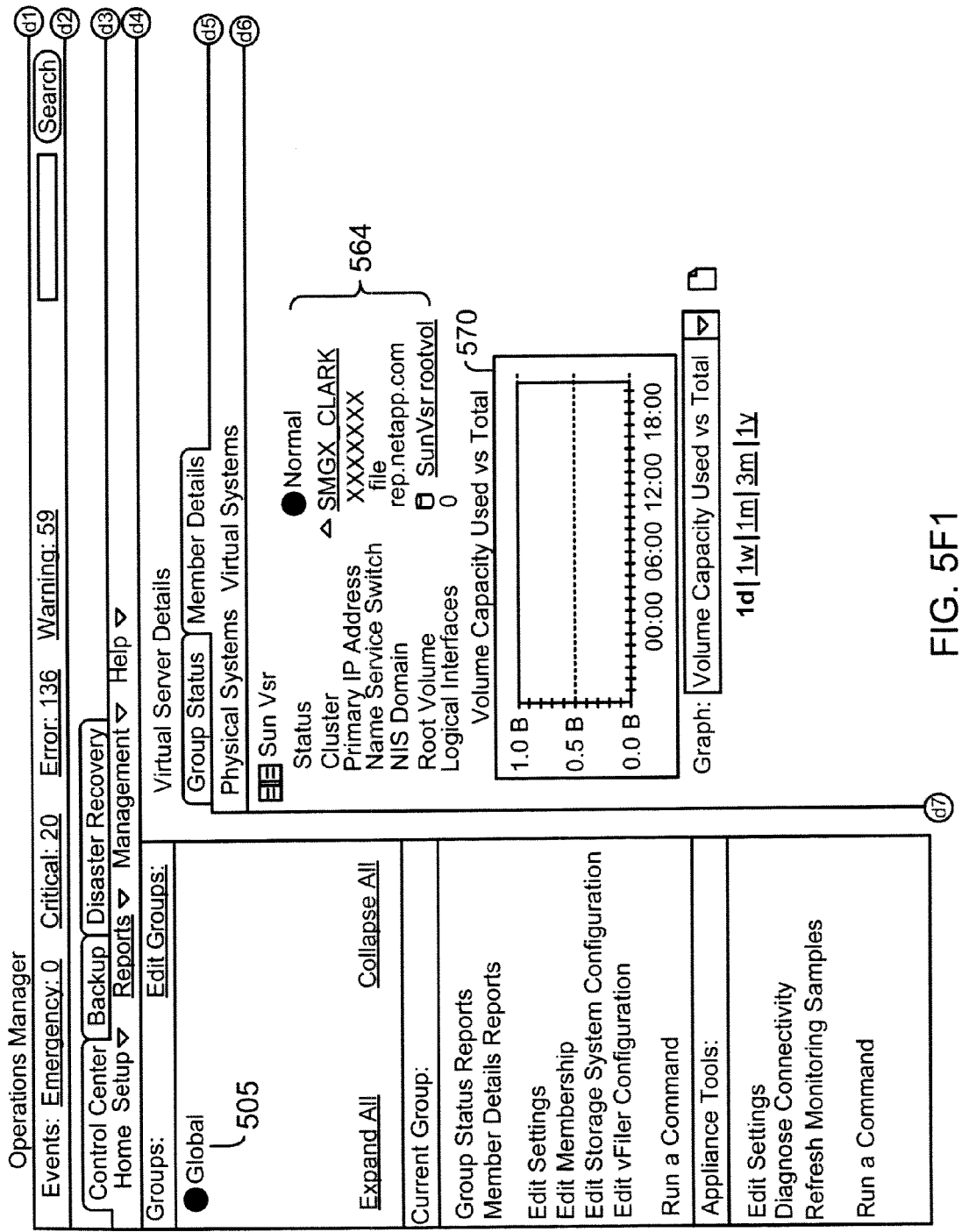
FIG. 5F1

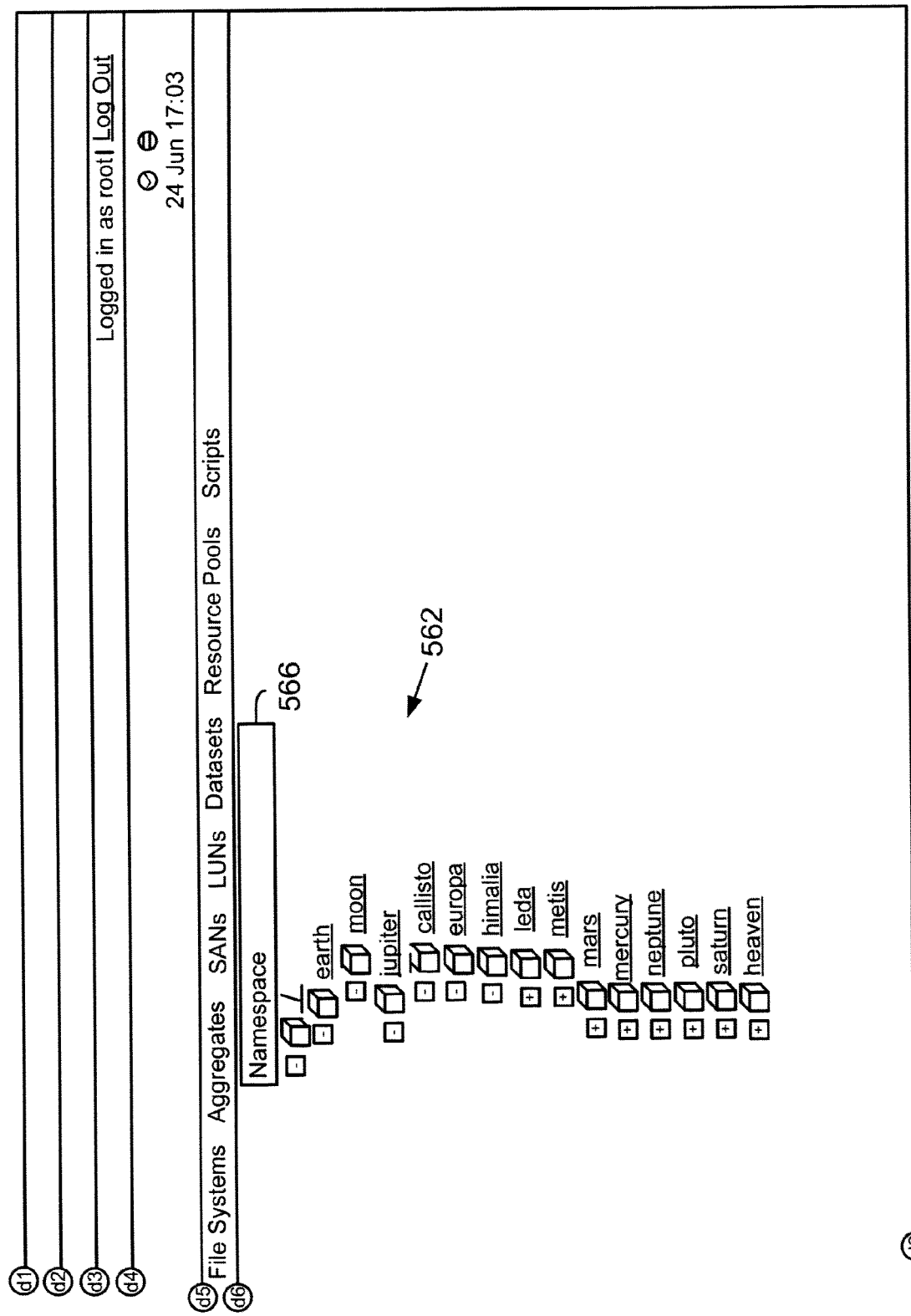

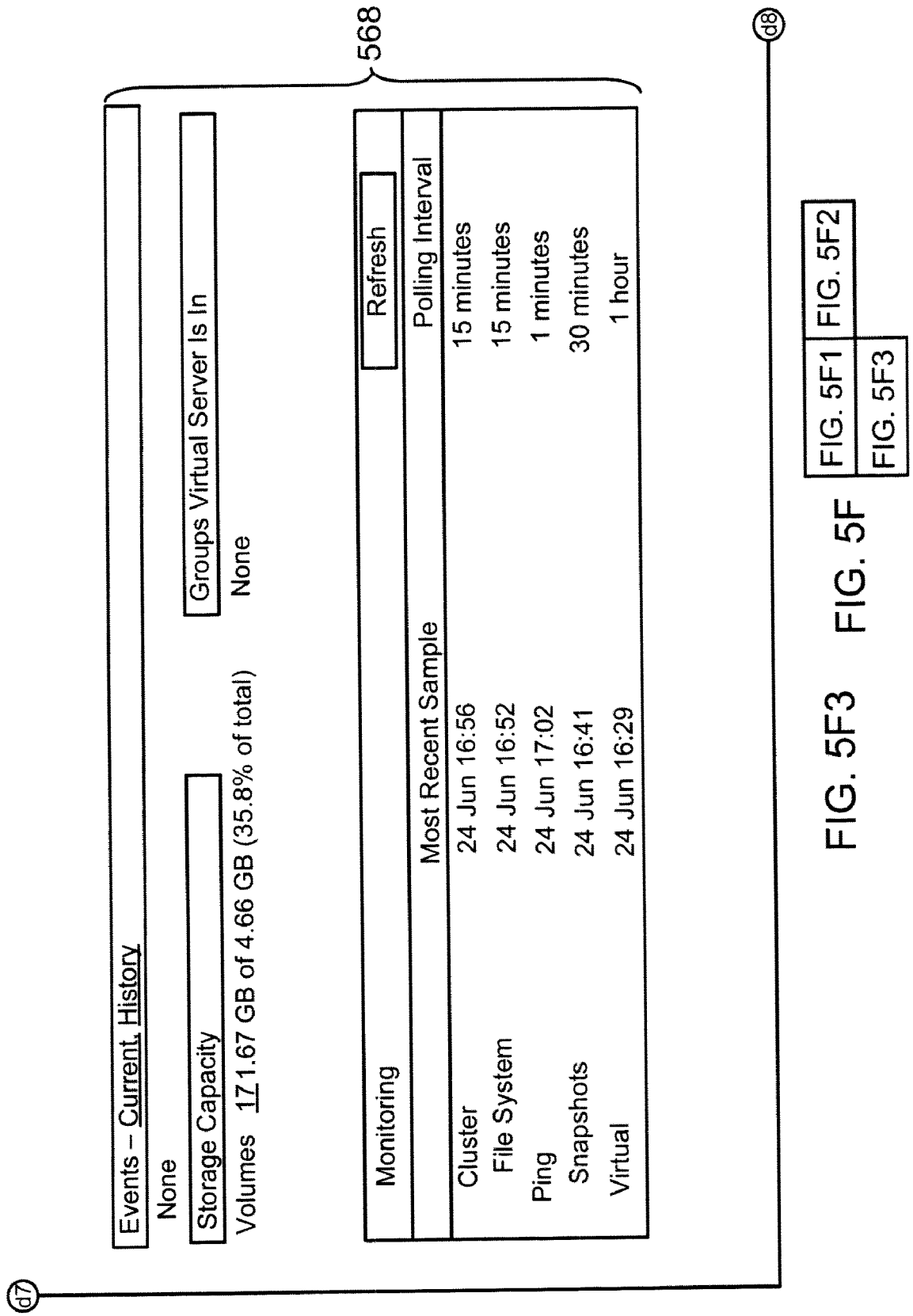
FIG. 5F3    FIG. 5F

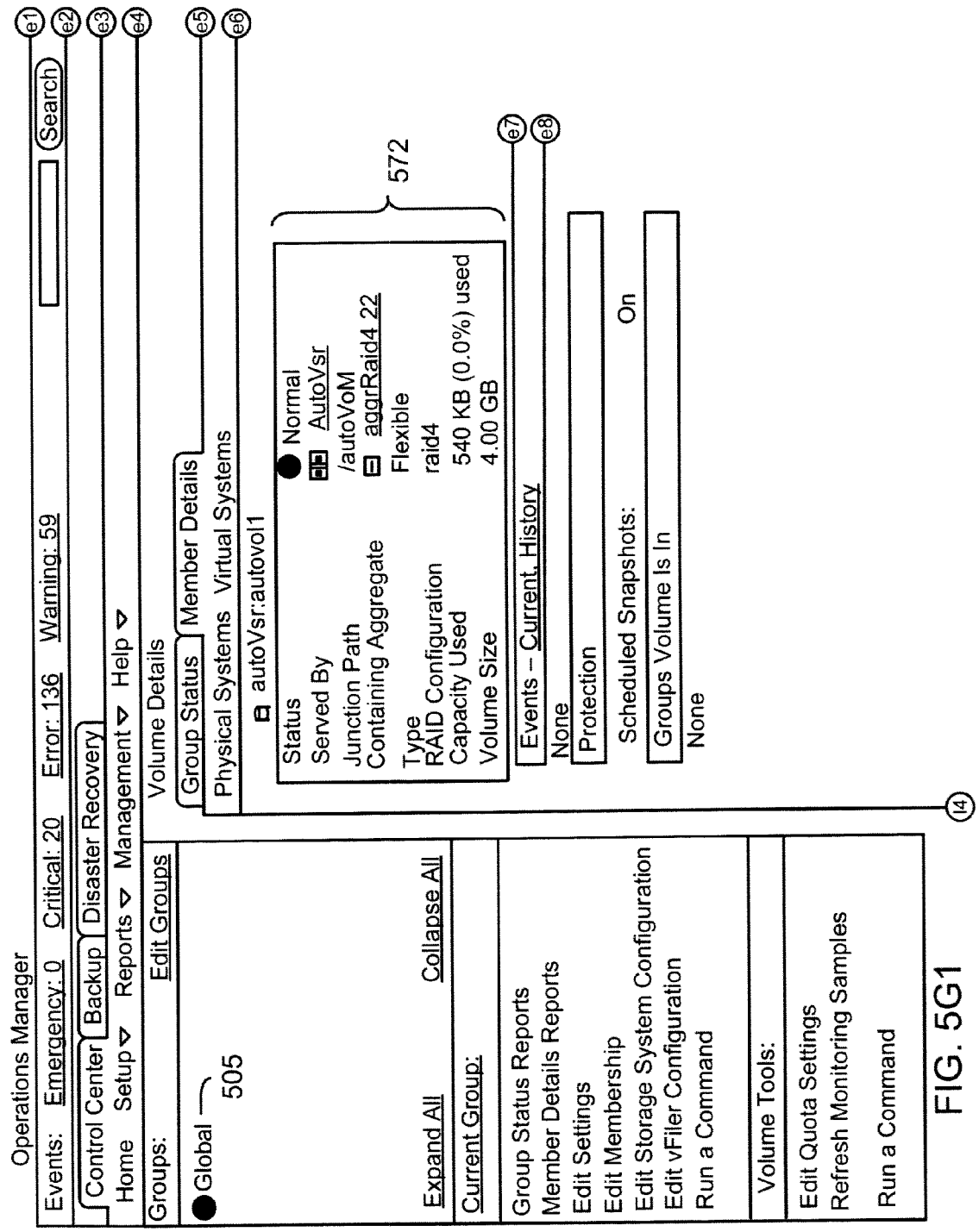
FIG. 5G1

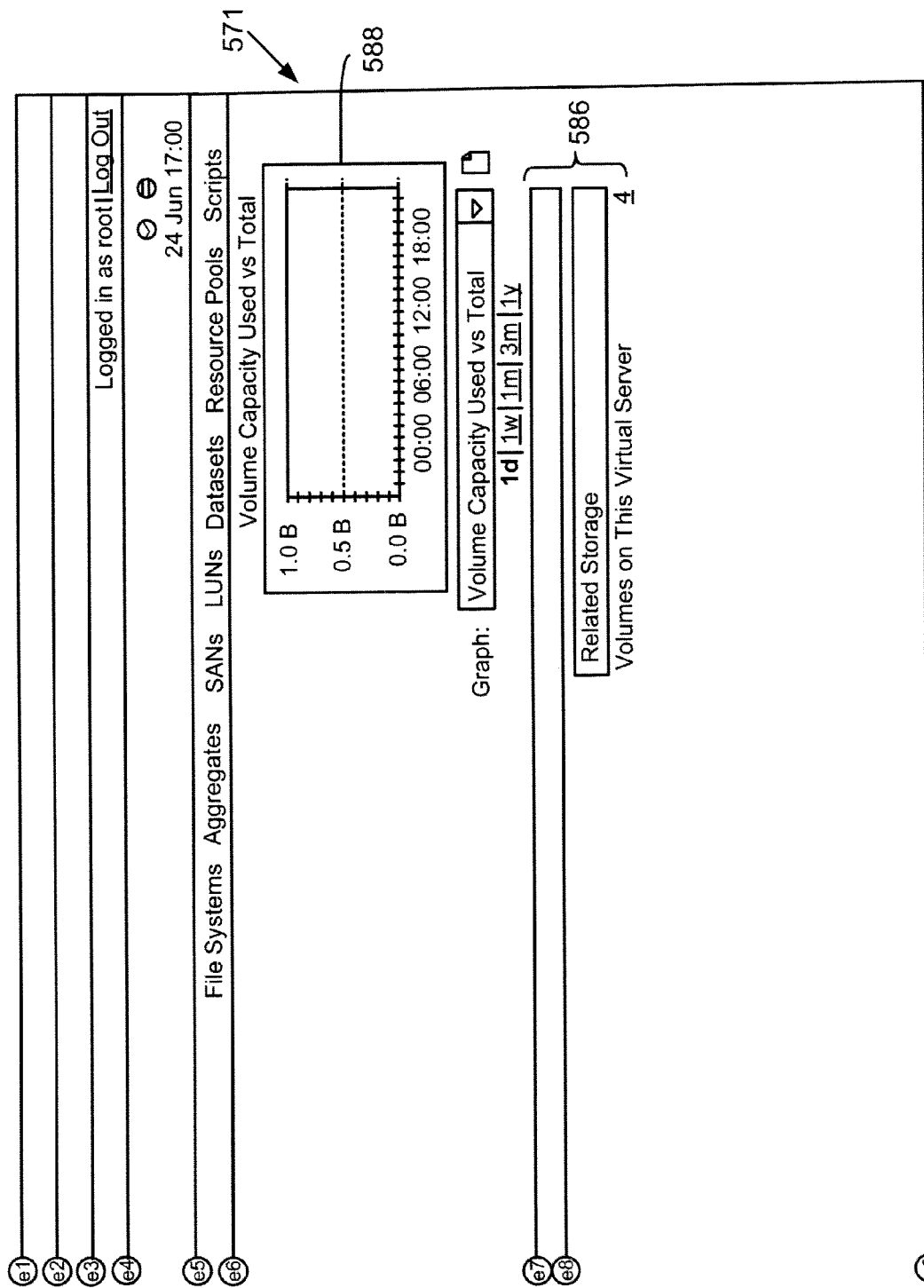
FIG. 5G2

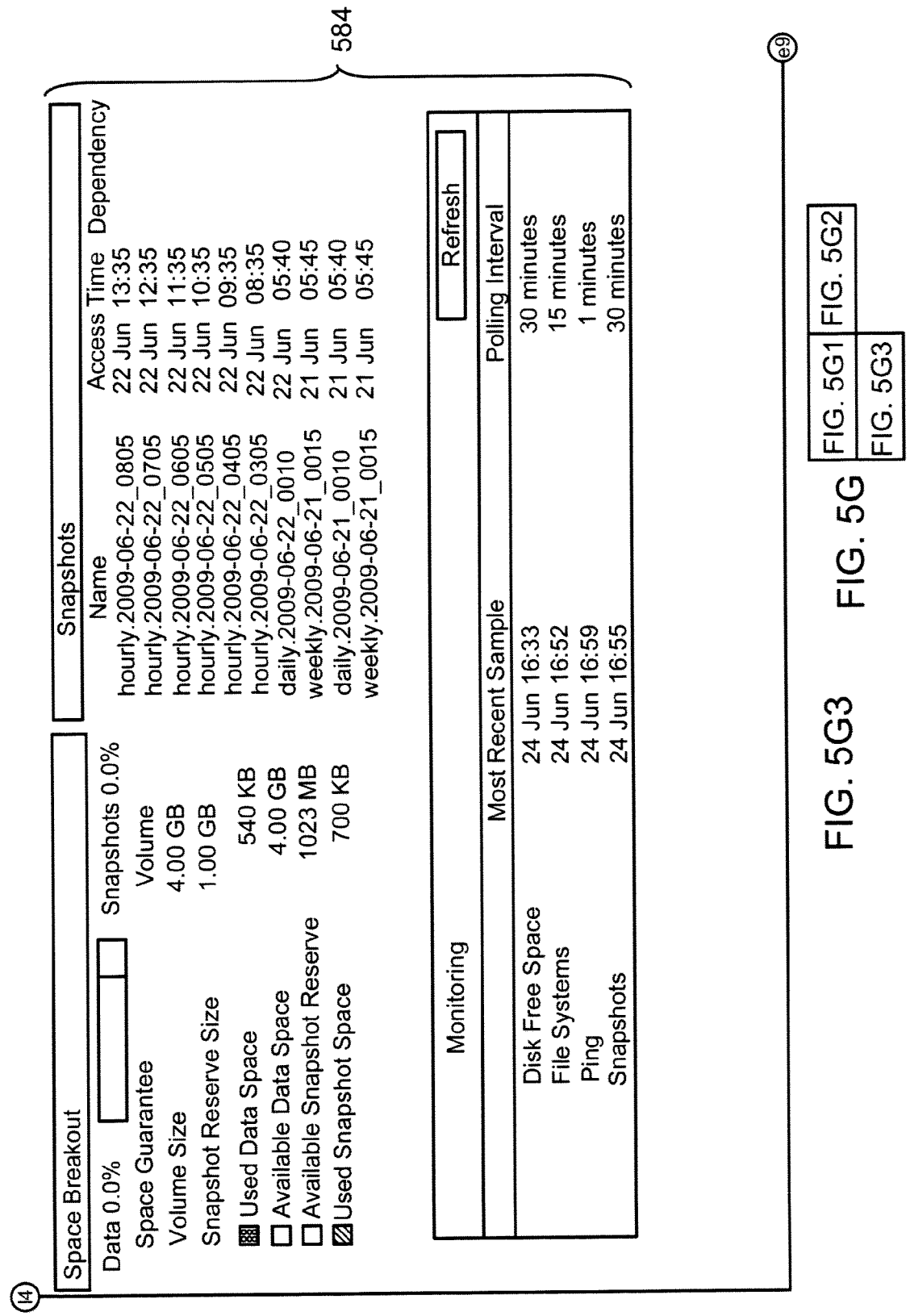
FIG. 5G3          FIG. 5G

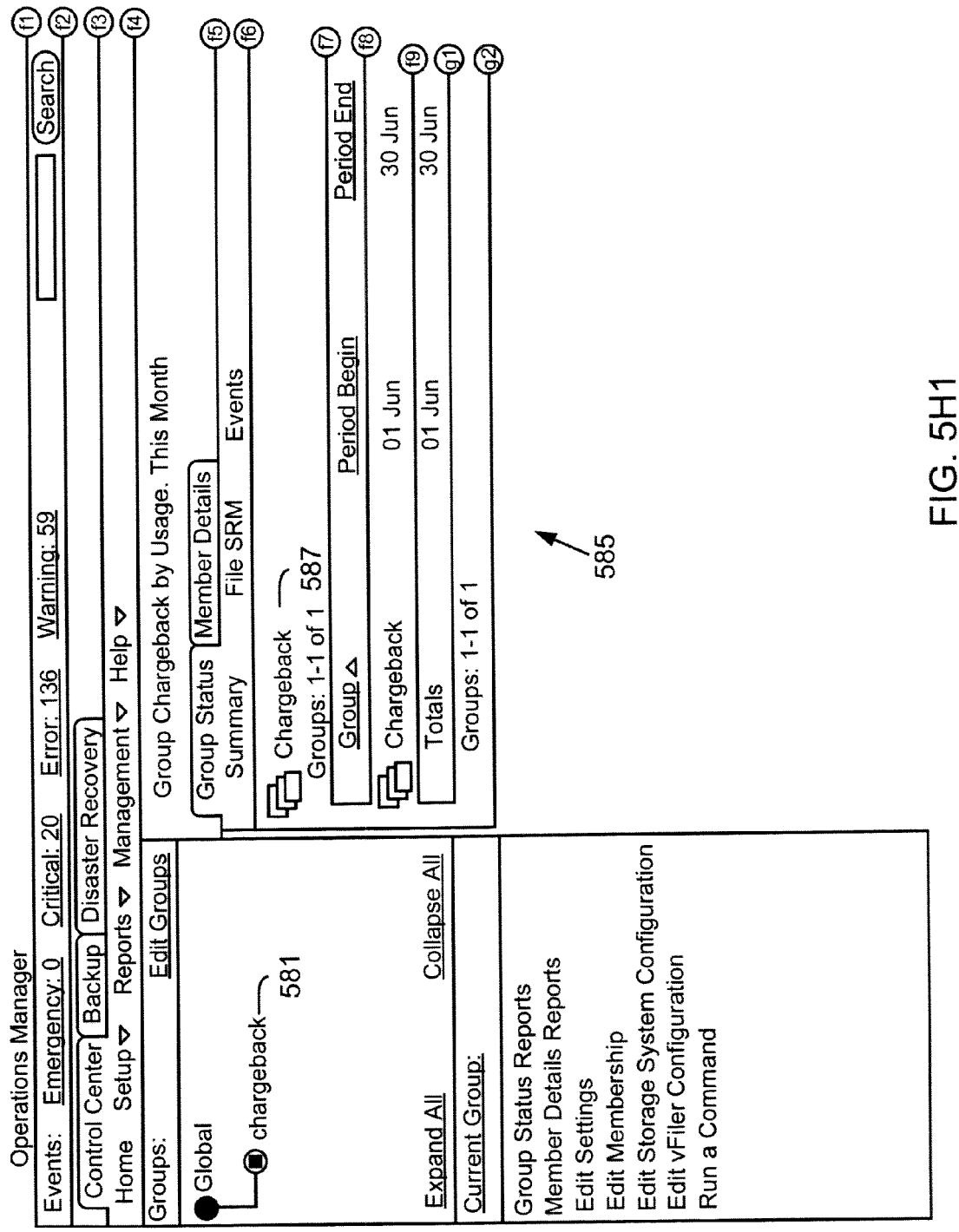
FIG. 5H1

| Days in Cycle | Average Usage | Annual Rate (per GB) | Monthly Rate (per GB) | Charge |
|---|---|---|---|---|
| 30 | 8.65 GB | $ 100.00 | $ 8.22 | $ 71.08 |
| 30 | 8.65 GB | | | $ 71.08 |

Report [Group Chargeback by Usage, This Month ▽]

Logged in as root | Log Out
24 Jun 17:22

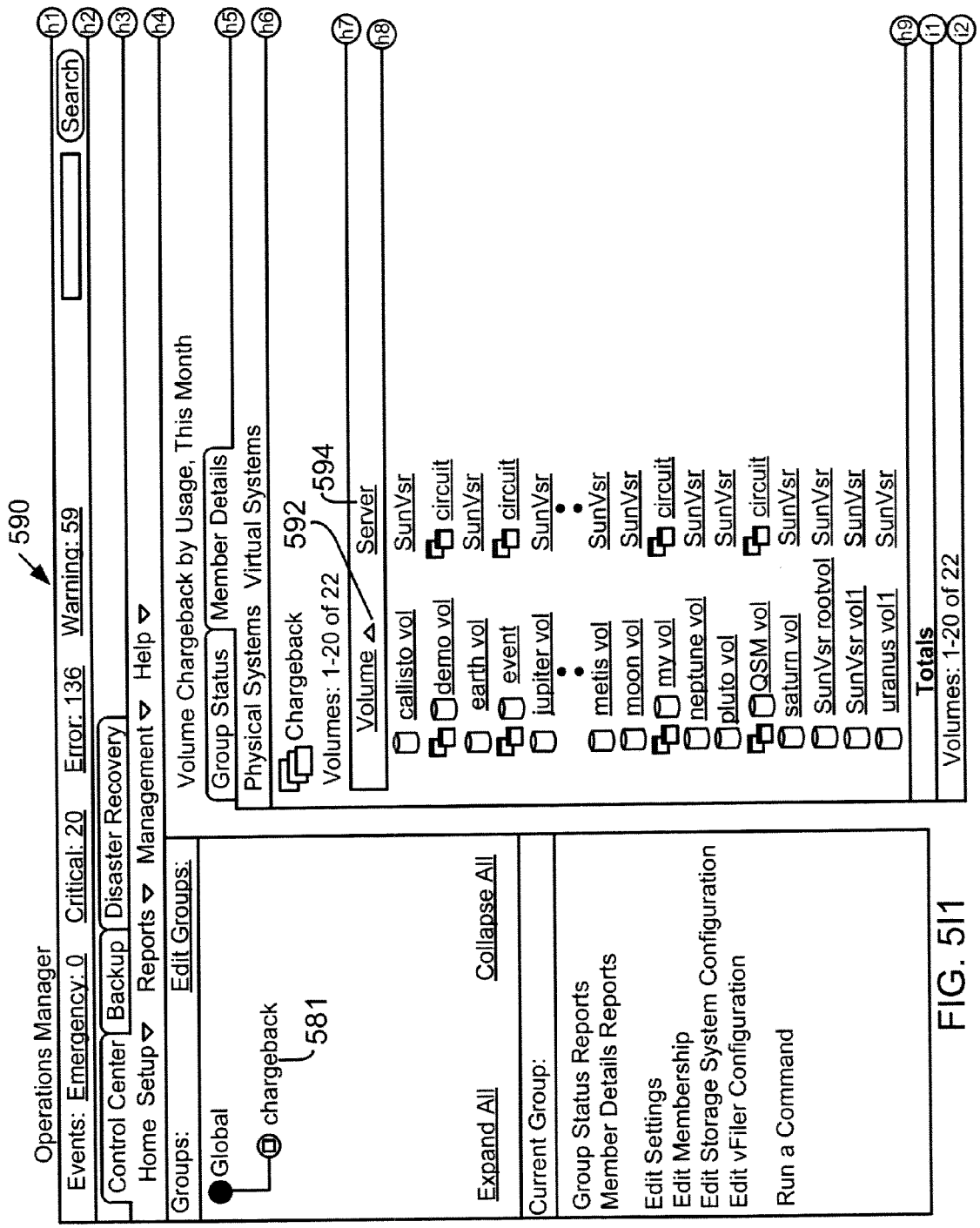
FIG. 5I1

Logged in as root| Log Out

24 Jun 17:24

| File Systems | Aggregates | SANs | LUNs | Datasets | Resource Pools | Scripts |

Report | Volume Chargeback by Usage, This Month ▽ |

Page: 1 2 ▷ Show Maximum

| Period Benefits | Period End | Days in Cycle | Average Usage | Annual Rate (per GB) | Monthly Rate (per GB) | Charge |
| --- | --- | --- | --- | --- | --- | --- |
| 01 Jun | 30 Jun | 30 | 8.74 MB | $ 100.00 | $ 8.22 | $ 0.07 |
| 01 Jun | 30 Jun | 30 | 3.20 GB | $ 100.00 | $ 8.22 | $ 26.30 |
| 01 Jun | 30 Jun | 30 | 70.3 MB | $ 100.00 | $ 8.22 | $ 0.56 |
| 01 Jun | 30 Jun | 30 | 400 MB | $ 100.00 | $ 8.22 | $ 3.21 |
| 01 Jun | 30 Jun | 30 | 40.3 MB | $ 100.00 | $ 8.22 | $ 0.32 |
| • • | • • | • • | • • | • • | • • | • • |
| 01 Jun | 30 Jun | 30 | 16.0 MB | $ 100.00 | $ 8.22 | $ 0.13 |
| 01 Jun | 30 Jun | 30 | 8.74 MB | $ 100.00 | $ 8.22 | $ 0.07 |
| 01 Jun | 30 Jun | 30 | 2.40 GB | $ 100.00 | $ 8.22 | $ 19.73 |
| 01 Jun | 30 Jun | 30 | 40.0 MB | $ 100.00 | $ 8.22 | $ 0.32 |
| 01 Jun | 30 Jun | 30 | 19.1 MB | $ 100.00 | $ 8.22 | $ 0.15 |
| 01 Jun | 30 Jun | 30 | 202 KB | $ 100.00 | $ 8.22 | $ 0.00 |
| 01 Jun | 30 Jun | 30 | 132 KB | $ 100.00 | $ 8.22 | $ 0.00 |
| 01 Jun | 30 Jun | 30 | 16.0 MB | $ 100.00 | $ 8.22 | $ 0.10 |
| 01 Jun | 30 Jun | 30 | 1.36 GB | $ 100.00 | $ 8.22 | $ 11.14 |
| 01 Jun | 30 Jun | 30 | 40.0 MB | $ 100.00 | $ 8.22 | $ 0.32 |
| 01 Jun | 30 Jun | 30 | 8.65 GB | | | $ 71.08 |

METHOD AND SYSTEM FOR MANAGING CLUSTERED AND NON-CLUSTERED STORAGE SYSTEMS

CROSS-REFERENCE TO RELATED APPLICATION

The present application is a continuation of U.S. patent application Ser. No. 12/561,592, filed Sep. 17, 2009 now U.S. Pat. No. 8,051,113, the disclosure of which is hereby incorporated by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to storage systems.

RELATED ART

Various forms of storage systems are used today. These forms include network attached storage (NAS) systems, storage area networks (SANs), and others. Network storage systems are commonly used for a variety of purposes, such as providing multiple users with access to shared data, backing up data (e.g., by data mirroring) and others.

A network storage system typically includes at least one computing system (may also be referred to as a "server"), which is a processing system configured to store and retrieve data on behalf of one or more client processing systems ("clients"). In the context of NAS, a storage server operates on behalf of one or more clients to store and manage shared files in a set of mass storage devices, such as magnetic or optical disks or tapes.

In a SAN context, the storage server provides clients with block-level access to stored data. Some storage systems may be capable of providing clients with both file-level access and block-level access.

Storage environments continue to evolve and grow. A storage environment today may include different types of storage systems, for example, a cluster based storage system (may also be referred to as cluster system or cluster based system) and a non-cluster based storage system (may also be referred to as non-cluster system or non-cluster based system). A cluster based system may have a distributed architecture; while a non-cluster based storage system may have a traditional monolithic architecture where a storage server has access to a dedicated storage subsystem.

Managing storage environments with different storage system types can be challenging and complex because different storage system types have different attributes, features and capabilities. Continuous efforts are being made to integrate storage environment management having different storage system types.

SUMMARY

In one embodiment, a method and system for managing a storage environment having a cluster based storage system and a non-cluster based storage system is provided. A management application collects information regarding components of both the cluster based storage system and the non-cluster based storage system. A layout having a plurality of data structures is generated and maintained by the management application. The data structures include information regarding the components and their relationships with each other, if any. The layout is used for responding to user requests and presenting an integrated view of the storage environment on a display device with selectable options for selecting the cluster based storage system components and the non-cluster based storage system components.

In another embodiment, a machine implemented method for a storage environment having a cluster based storage system and a non-cluster based storage system is provided. Information regarding a plurality of components of both the cluster based storage system and the non-cluster based storage system is collected. A layout having a plurality of data structures for storing information regarding the plurality of components of both the cluster based storage system and the non-cluster based storage system is generated. A client request for information regarding a component of the storage environment is received and a data structure from the layout and associated with the component of the storage environment is retrieved. Thereafter, information regarding the component is presented to the user.

In yet another embodiment, a machine readable storage medium storing executable instructions, which when executed by a machine, causes the machine to manage a storage environment having a cluster based storage system and a non-cluster based storage system is provided. The method includes: (a) collecting information regarding a plurality of components of both the cluster based storage system and the non-cluster based storage system; (b) generating a layout having a plurality of data structures for storing information regarding the plurality of components of both the cluster based storage system and the non-cluster based storage system; (c) receiving a client request requesting information regarding a component of the storage environment; (d) retrieving a data structure associated with the component of the storage environment; and (e) presenting information regarding the component to the user.

In another embodiment, a computer program product is provided. The product includes a computer usable storage medium having computer readable instructions embodied therein for managing a storage environment having a cluster based storage system and a non-cluster based storage system. The medium includes (a) instructions for collecting information regarding a plurality of components of both the cluster based storage system and the non-cluster based storage system; (b) instructions for generating a layout having a plurality of data structures for storing information regarding the plurality of components of both the cluster based storage system and the non-cluster based storage system; (c) instructions for receiving a client request requesting information regarding a component of the storage environment; (d) instructions for retrieving a data structure associated with the component of the storage environment; and (e) instructions for presenting information regarding the component to the user.

In yet another embodiment, a machine implemented method for managing a storage environment having a cluster based storage system and a non-cluster based storage system is provided. The method generates a layout having a plurality of data structures. The plurality of data structures are used for storing information regarding a plurality of components of the cluster based storage system and the non-cluster based storage system. The layout is used for presenting an integrated view of the storage environment on a display device with selectable options for selecting the cluster based storage system components and the non-cluster based storage system components.

The embodiments disclosed herein provide useful tools to a user for efficiently managing a storage environment. A user is able to view various components of both the cluster based and non-cluster based storage systems. Because a user is able to get an integrated view and can drill down to both logical and physical component levels, the user can troubleshoot disruptions and problems in a storage environment.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIGS. 5A-5I show various screen shots using the layout of FIG. 4A, according to the various embodiments of the present disclosure;

DETAILED DESCRIPTION

Definitions

Figure 1A:
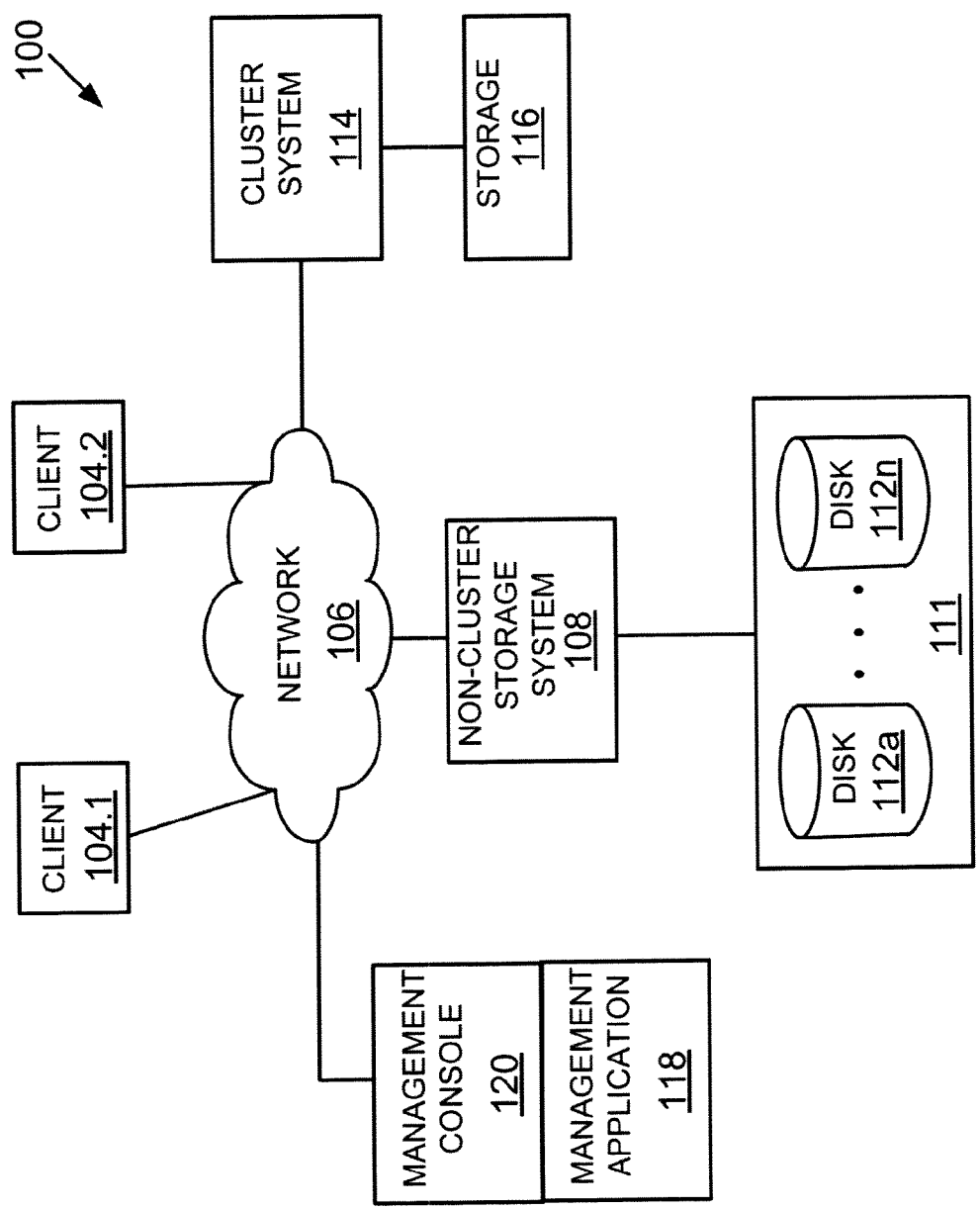
FIG. 1A shows a block diagram of a storage environment, managed according to one embodiment.

The following definitions are provided as they are typically (but not exclusively) used in the computing/storage environment, implementing the various adaptive embodiments described herein.

"Aggregate" is a logical aggregation of physical storage, i.e., a logical container for a pool of storage, combining one or more physical mass storage devices (e.g., disks) or parts thereof into a single logical storage object, which includes or provides storage for one or more other logical data sets at a higher level of abstraction (e.g., volumes).

"CIFS" means the Common Internet File System Protocol, an access protocol that client systems use to request file access services from storage systems over a network.

"Data Container" or "Dataset" means a block, a file, a logical unit of data or any other information.

"FC" means Fibre Channel, a high-speed network technology primarily used for storage networking. Fibre Channel Protocol (FCP) is a transport protocol (similar to Transmission Control Protocol (TCP) used in Internet Protocol ("IP") networks) which predominantly transports SCSI commands over Fibre Channel networks.

"Global Namespace" refers to a virtual hierarchical collection of unique volume names or identifiers and directory paths to the volumes, in which the volumes are stored on multiple server nodes within a clustered storage server system. In the context of the present disclosure, the global namespace of a clustered storage server system can be extended to include not only the identifiers of volumes stored on the multiple nodes of the clustered system, but also the identifiers of volumes stored on one or more storage systems that are remote from and do not constitute a part of the clustered system.

"iSCSI" means the Internet Small Computer System Interface, an IP based storage networking standard for linking data storage facilities. The standard allows carrying SCSI commands over IP networks. iSCSI may be used to transmit data over local area networks (LANs), wide area networks (WANs), or the Internet and can enable location-independent data storage and retrieval.

"Namespace" refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data files, scripts, word processing documents, executable programs, etc. In a typical storage system, the names or identifiers of the volumes stored on a storage server can be linked into a namespace for that storage server.

"NFS" means Network File System, a protocol that allows a user to access storage over a network.

"Resource Pool" means a collection of one or more storage systems and one or more aggregates, and its configuration is typically determined by a network storage administrator.

"Volume" is a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an aggregate.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Storage Environment 100:

FIG. 1A depicts an illustrative embodiment of a storage environment 100 having a management console 120 for executing the adaptive embodiments of the present disclosure described below in detail. Storage environment 200 includes a plurality of client systems 104.1-104.2, a non-cluster based storage system 108 (may also be referred to as storage system 108), a cluster based storage system 114 (may also be referred to as cluster system 114 or cluster storage system 114), management console 120 and at least one network 106 communicably connecting client systems 104.1-104.n, non-cluster based storage system 108, cluster system 114 and management console 120. The client systems 104.1-104.2 may be connected to the storage system 108 and cluster system 114 via the computer network 106, such as a packet-switched network.

Clients 104.1-104.2 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed random access memory (RAM) circuits. A computer system with the CPU and main memory is often referred to as a host system.

Details regarding cluster 114 and associated storage 116 are provided below in detail.

Storage system 108 may include a storage subsystem 111 having multiple mass storage devices (e.g., disks) 112a-112n (may also be referred to as 112). The mass storage devices in storage subsystem 111 may be, for example, conventional magnetic disks, optical disks such as CD-ROM or DVD based storage, magneto-optical (MO) storage, or any other type of non-volatile storage devices suitable for storing data.

Processors executing instructions in storage system 108, cluster 114 and client systems 104.1-104.2 communicate according to well-known protocols, such as the NFS protocol or the CIFS protocol, to make data stored on the disk 112 (or storage 116 for cluster system 114) appear to users and/or application programs as though the data were stored locally on the client systems 104.1-104.2. The storage system 108 and/or cluster 114 can present or export data stored on disks 112 (or 116 for cluster system 114) as a volume, or one or more qtree sub-volume units, to each of the client systems 104.1-104.2. Each volume is configured to store data files, scripts, word processing documents, executable programs, and the like.

From the perspective of one of the client systems 104.1-104.2, each volume can appear to be a single disk drive. However, each volume can represent the storage space in one disk, an aggregate of some or all of the storage space in multiple disks, a RAID group, or any other suitable set of storage space.

Specifically, each volume can include a number individually addressable files. For example, in a network attached storage (NAS) configuration, the files of a volume are addressable over the computer network 106 for file-based access. In addition, an aggregate is a fixed-sized volume built on top of a number of RAID groups containing one or more virtual volumes or FlexVol® flexible volumes.

In a typical mode of operation, one of the client systems 104.1-104.2 transmits one or more input/output commands, such as an NFS or CIFS request, over the computer network 106 to the storage system 108 (and/or cluster system 114), which receives the request, issues one or more I/O commands to disk 112 to read or write the data on behalf of the client system 104.1-104.2, and issues an NFS or CIFS response containing the requested data over the network 106 to the respective client system.

The management console 120 may store and execute a storage management application 118. The management console 120 may be, for example, a conventional PC, workstation, or the like. The storage management application 118 may be a module with executable instructions, typically used by a storage network administrator to manage a pool of storage devices (may also be referred to as a "resource pool"). This application enables the administrator to perform various operations, such as monitoring and allocating storage space in the storage pool, creating and deleting volumes, directories and others.

Communication between the storage management application 118, storage system 108 and cluster system 114 may be accomplished using any of the various conventional communication protocols and/or application programming interfaces (APIs), the details of which are not germane to the technique being introduced here. This communication can be done through the network 106 or it can be via a direct link (not shown) between the management console 14 and one or more of the storage systems.

Managing a storage environment with cluster system 114 and non-cluster based system 108 can be challenging for a storage administrator because the systems may use different versions of the operating systems and may have different attributes and capabilities. One option is to manage different components (i.e., 108 and 114) using different applications. For example, one application version may be used to manage cluster system 114 and a second and different version may be used to manage storage system 108. This may be commercially undesirable because clients will have to maintain two different versions/types of management applications. Furthermore, this option does not provide a complete integrated view of the entire storage environment that a storage administrator may want in order to troubleshoot and improve overall storage environment usage.

The various embodiments disclosed herein provide an integrated solution for managing both cluster and non-cluster type of storage systems.

Figure 1B:
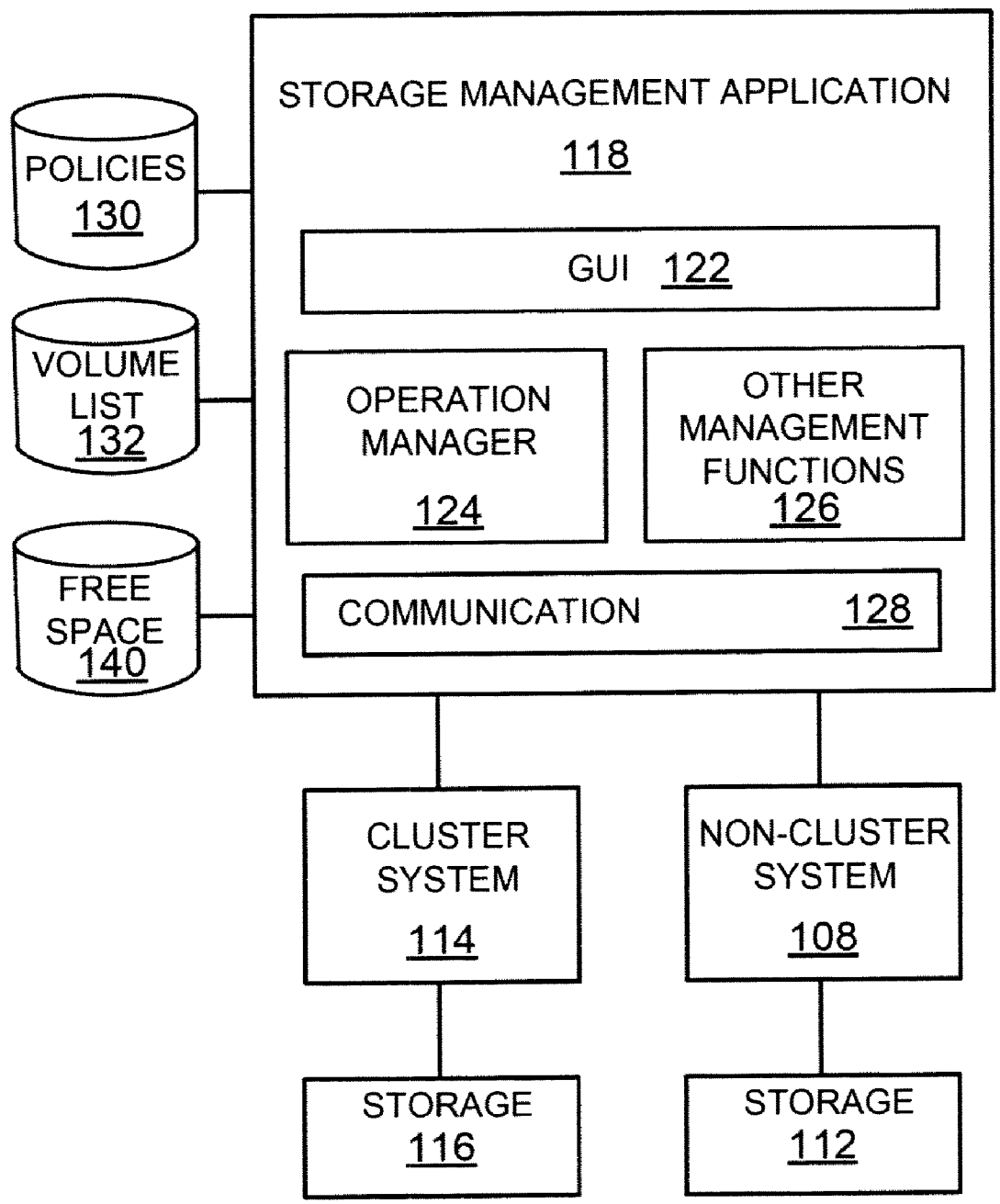
FIG. 1B shows an example of a management application used for managing the storage environment of FIG. 1A, according to one embodiment.

Storage Management Application 118:

The techniques being introduced here can be implemented in the storage management application 118. FIG. 1B shows an illustrative block diagram of storage management application 118, according to certain embodiments that implement the processes described below. In the illustrated embodiment, the storage management application 118 includes a graphical user interface (GUI) module 122 to generate a GUI (e.g., for use by a storage administrator); an Operations Manager 124 for managing both storage system 108 and cluster system 114, according to one embodiment; one or more other management modules 126 to perform various other storage management related functions; and a communication module 128.

Operations Manager 124 performs various management related functions for both storage system 108 and cluster system 114, described below in more detail. The communication module 128 implements one or more conventional communication protocols and/or APIs to enable the storage management application 118 to communicate with the storage system 108 and cluster system 114.

The storage management application 118 may also maintain policies 130, a list 132 of all volumes in a storage pool as well as a table 140 of all free space (on a per-disk basis) in a storage pool.

In one embodiment, Operations Manager 124 communicates with cluster based system 114 and non-cluster based system 108 to obtain information regarding various physical and logical components of storage environment 100. The communication occurs via communication module 128. Operations Manager 124 collects and regularly updates information regarding storage space, volumes, flexible volumes, striped volumes, member volumes, member aggregates, striped aggregates, physical port information, and logical interface information for data ports, management ports and cluster ports, as described below. In one embodiment, Operations Manager 124 manages the collected information by generating a layout 400 (FIG. 4A, described below), which allows management application 118 to present storage environment information in a plurality of views.

Clustered System:

Before describing the various adaptive embodiments of the present disclosure, the following describes the functionality of a cluster system as used in an integrated storage environment 200, similar to the storage environment 100 described above. Management console 120 executing management application 118 manages the storage environment 200, according to one embodiment.

Figure 2:
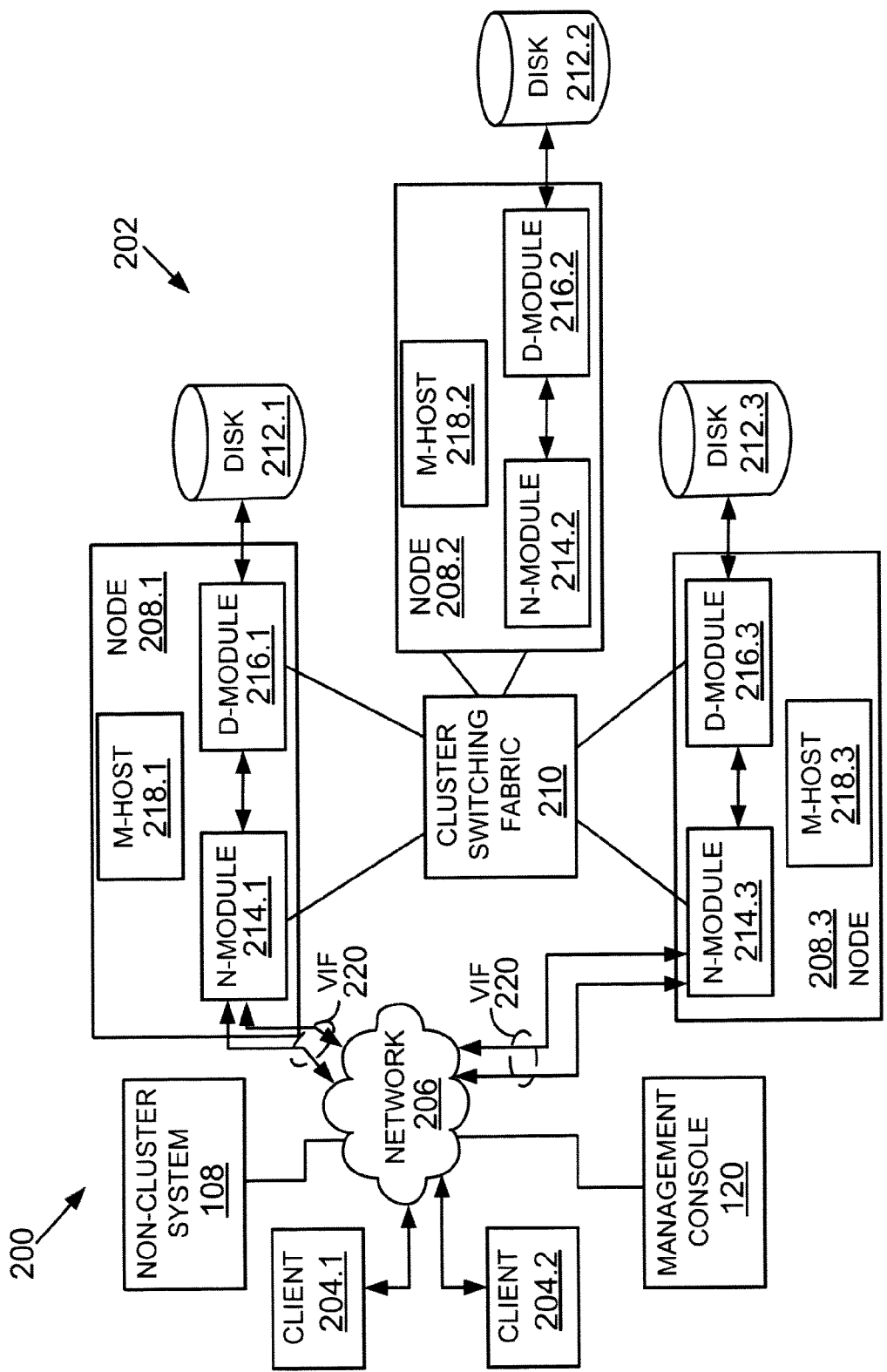
FIG. 2 shows an example of a storage environment with details of a cluster system, managed according to one embodiment.

FIG. 2 depicts an illustrative embodiment of the storage environment 200, including a plurality of client systems 204.1-204.2 (similar to 104.1-104.2), a clustered storage system 202 (similar to cluster system 114), non-cluster based storage system 108, management console 120 and at least one computer network 206 (similar to network 106) communicably connecting the client systems 204.1-204.2, non-cluster system 108 and the clustered storage server system 202.

As shown in FIG. 2, the clustered storage server system 202 includes a plurality of nodes 208.1-208.3, cluster switching fabric 210, and a plurality of mass storage devices such as disks 212.1-212.3 (may also be referred to as disks 212 (similar to storage 116)). Clustered storage systems like the clustered storage system 202 are available from NetApp, Inc.

Each of the plurality of nodes 208.1-208.3 may be configured to include an N-module, a D-module, and an M-host, each of which can be implemented as a separate software module. Specifically, node 208.1 includes an N-module 214.1, a D-module 216.1, and an M-host 218.1; node 208.2 includes an N-module 214.2, a D-module 216.2, and an M-host 218.2; and node 208.3 includes an N-module 214.3, a D-module 216.3, and an M-host 218.3.

The N-modules 214.1-214.3 include functionality that enables the respective nodes 208.1-208.3 to connect to one or more of the client systems 204.1-204.2 over the computer network 206, while the D-modules 216.1-216.3 connect to one or more of the disks 212.1-212.3.

The M-hosts 218.1-218.3 provide management functions for the clustered storage server system 202. Accordingly, each of the plurality of server nodes 208.1-208.3 in the clustered storage server arrangement provides the functionality of a storage server.

A switched virtualization layer including a plurality of virtual interfaces (VIFs) (may also be referred to a logical interfaces (LIFs)) 220 is provided below the interface between the respective N-modules 214.1-214.3 and the client systems 204.1-204.2, allowing the disks 212.1-212.3 associated with the nodes 208.1-208.3 to be presented to the client systems 204.1-204.2 as a single shared storage pool. For example, the switched virtualization layer may implement a virtual interface architecture. FIG. 2 depicts only the VIPs 220 at the interfaces to the N-modules 214.1, 214.3 for clarity of illustration.

It is noted that the clustered storage server system 202 can be organized into any suitable number of virtual servers (also referred to as "vservers"), in which each vserver represents a single storage system namespace with separate network access. Each vserver has a user domain and a security domain that are separate from the user and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, but only through the VIFs associated with that vserver.

Each of the nodes 208.1-208.3 is defined as a computer adapted to provide application services to one or more of the client systems 204.1-204.2. In this context, a vserver is an instance of an application service provided to a client system. The nodes 208.1-208.3 are interconnected by the switching fabric 210, which, for example, may be embodied as a Gigabit Ethernet switch. Although FIG. 2 depicts an equal number (i.e., 3) of the N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage server system 202. For example, in alternative embodiments, the clustered storage server system 202 may include a plurality of N-modules and a plurality of D-modules interconnected in a configuration that does not reflect a one-to-one correspondence between the N-modules and D-modules.

The clustered storage server system 202 can include the NETAPP® DATA ONTAP® storage operating system, available from NetApp, Inc., that implements the WAFL® storage system, or any other suitable storage operating system.

The client systems 204.1-204.2 of FIG. 2 may be implemented as general-purpose computers configured to interact with the respective nodes 208.1-208.3 in accordance with a client/server model of information delivery. In the presently disclosed embodiment, the interaction between the client systems 204.1-204.2 and the nodes 208.1-208.3 enable the provision of network data storage services.

Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS protocol or the CIFS protocol, when accessing information in the form of files and directories.

In a typical mode of operation, one of the client systems 204.1-204.2 transmits an NFS or CIFS request for data to one of the nodes 208.1-208.3 within the clustered storage server system 202, and the VIF 220 associated with the respective node receives the client request. It is noted that each VIF 220 within the clustered system 202 is a network endpoint having an associated IP address, and that each VIF can migrate from N-module to N-module. The client request typically includes a file handle for a data file stored in a specified volume on one or more of the disks 212.1-212.3.

Specifically, each volume comprises a storage system subtree that includes an index node file (an inode file) having a root inode, and a set of directories and files contained under the root inode. Each inode is a data structure allocated for a respective data file to store metadata that describes the data file. For example, an inode can contain data and pointers for use in facilitating access to blocks of data within the data file, and each root inode can contain pointers to a number of inodes. In addition, an aggregate is a fixed-sized volume built on top of a number of RAID groups containing one or more virtual volumes or FlexVol® flexible volumes.

Figure 3A:
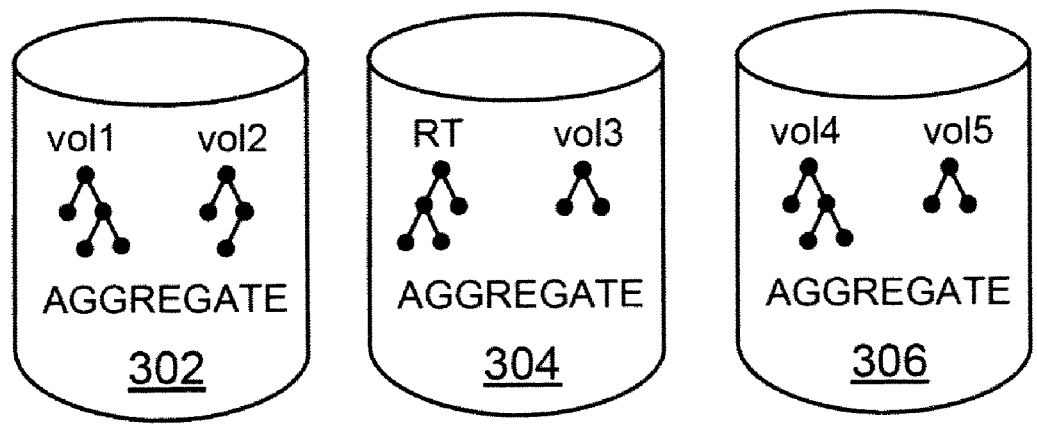
FIG. 3A shows an example of an aggregate, used according to one embodiment.

FIG. 3A depicts three exemplary aggregates 302, 304, 306, which can be stored on one or more of the disks 212.1-212.3 of the clustered storage server system 202 (see FIG. 2) and viewed within a same user interface, as described below. As shown in FIG. 3A, each of the aggregates 302, 304, 306 contains two representative volumes, in which each volume comprises a storage system subtree. Specifically, the aggregate 302 contains two volumes vol1, vol2; the aggregate 304 contains two volumes RT, vol3; and the aggregate 306 contains two volumes vol4, vol5. In the clustered storage server system 202, the names of the volumes from the plurality of nodes 208.1-208.3 are linked into a global namespace, allowing the client systems 204.1-204.2 to mount the volumes from one of the nodes 208.1-208.3 with a high level of flexibility.

Figure 3B:
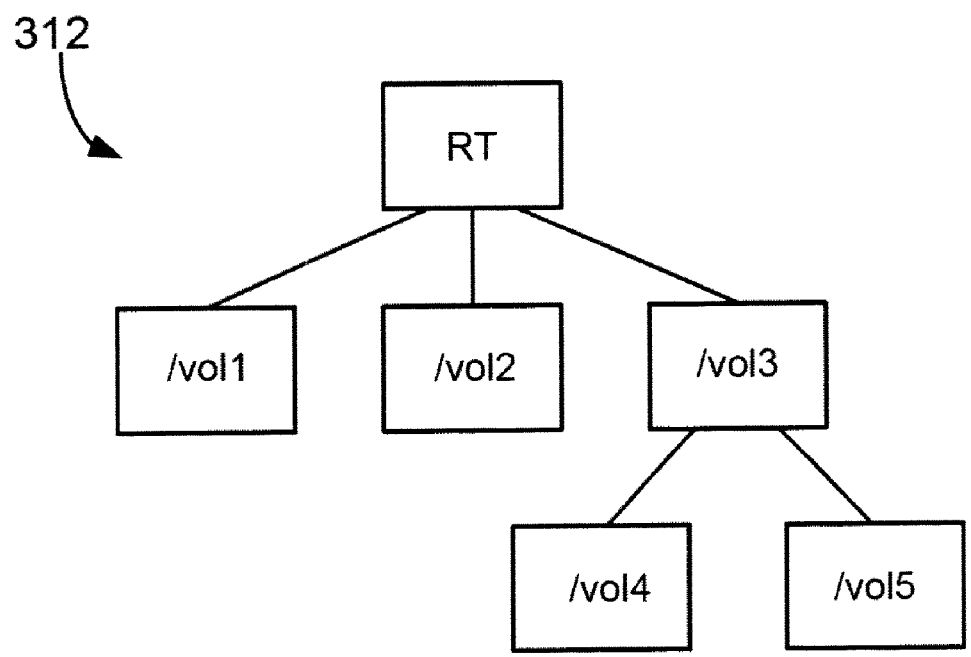
FIG. 3B shows an example of a namespace used according to one embodiment.

FIG. 3B depicts an exemplary global namespace 312 composed of the volumes RT, vol1, vol2, vol3, vol4, vol5. In the global namespace 312, each volume RT, vol1-vol5 represents a virtualized container storing a portion of the global namespace 312 descending from a single root directory. The volumes RT, vol1-vol5 are linked together in the global namespace 312 through a number of junctions. A junction is an internal mount point which, to a client, resolves to a directory (which would be the root directory of the target volume). Such a junction can appear anywhere in a volume, and can link a volume to the root directory of another volume. For example, in the clustered system 202, a junction in the volume vol3 associated with the D-module 216.2 links that volume to the root directory of the volume vol4, which is associated with the D-module 216.3. A junction can therefore link a volume on one of the D-modules 216.1-216.3 to another volume on a different one of the D-modules 216.1-216.3.

As shown in FIG. 3B, the global namespace 312 includes the volume RT (i.e., the root volume), which has three junctions linking the volume RT to the volumes vol1, vol2, vol3. The global namespace 312 further includes the volume vol3, which has two junctions linking the volume vol3 to the volumes vol4, vol5.

Figure 4A:
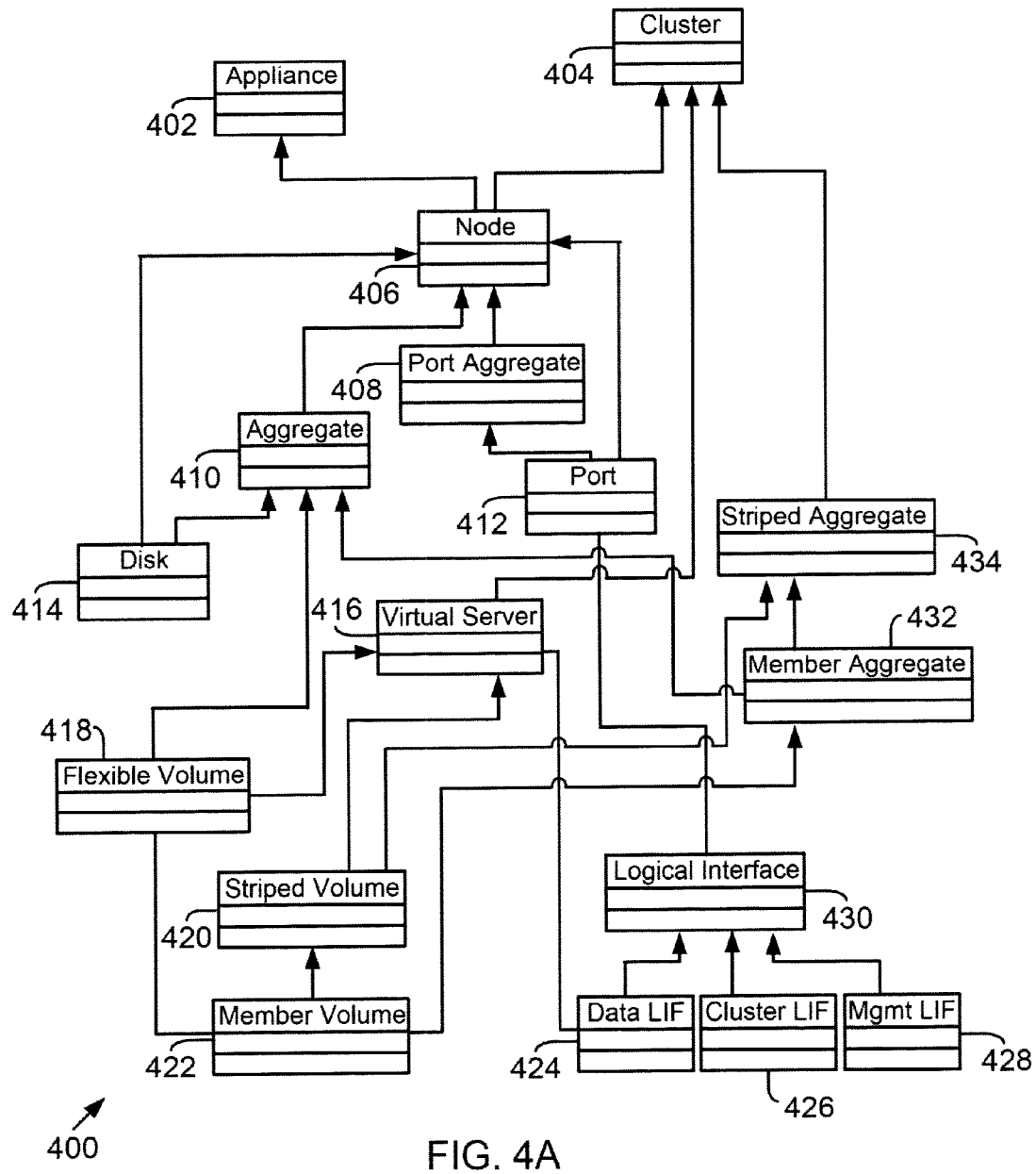
FIG. 4A shows an example of a layout having a plurality of data structures, used for managing a storage environment, according to one embodiment.

Integrated Architecture 400:

FIG. 4A shows a block diagram of an illustrative embodiment of a layout 400 that is generated and maintained by management application 118 to manage and present storage environment 200 (or storage environment 100, used interchangeably throughout this disclosure) to a user (for example, a storage administrator). Layout 400 having a plurality of data structures is generated by Operations Manager 124 that collects and maintains information received from both the cluster based and non-cluster based storage systems of storage environment 200. Operations Manager 124 using layout 400 maintains the relationships between various physical and logical components of storage environment 200. This allows management application 118 to receive a client request for information regarding physical, logical and both physical and logical components of the storage environment and provide the requested information per the client request.

Figure 4B:
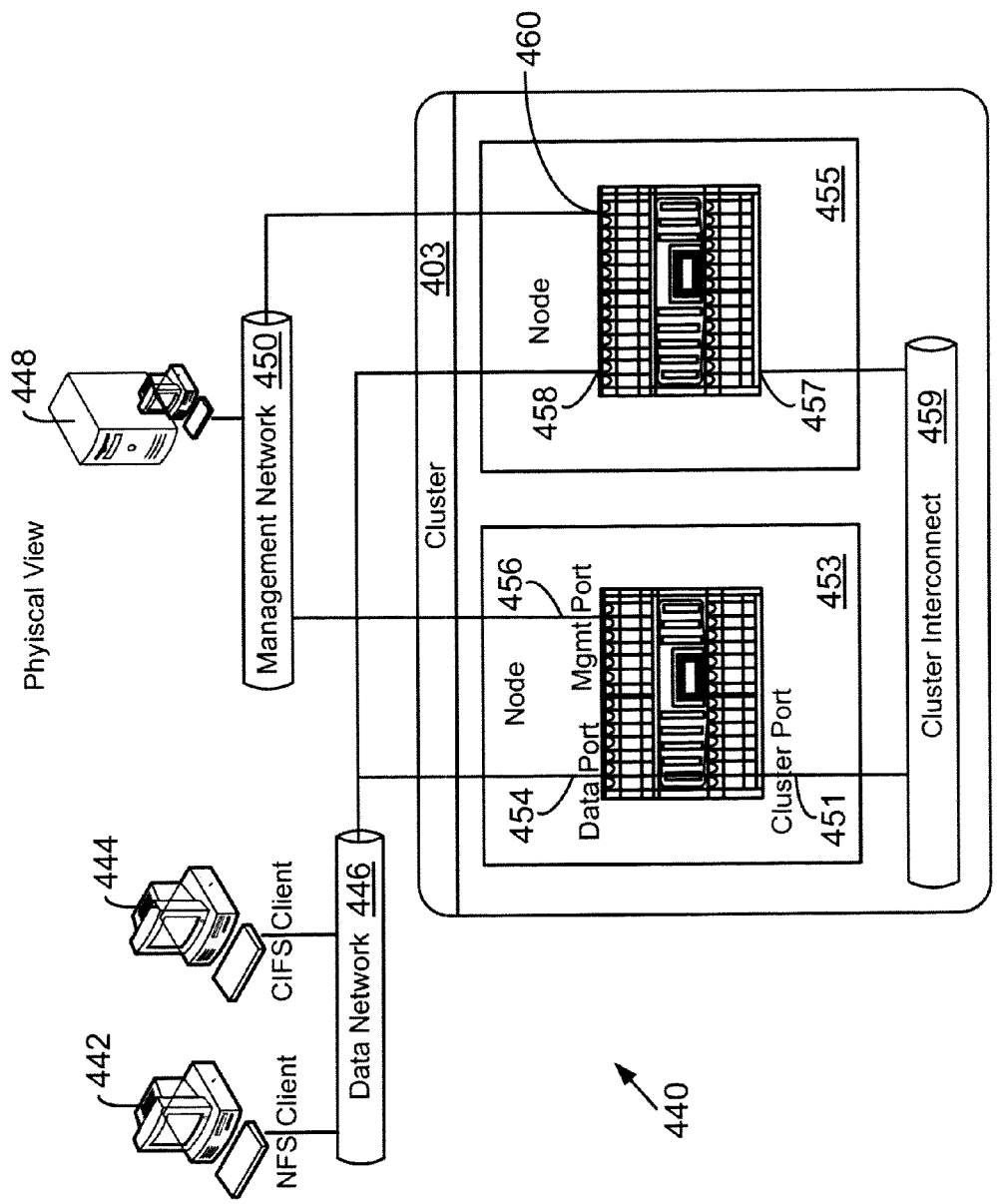
FIGS. 4B-4D show examples of different type of views, used for managing a storage environment, according to one embodiment.
Figure 4C:
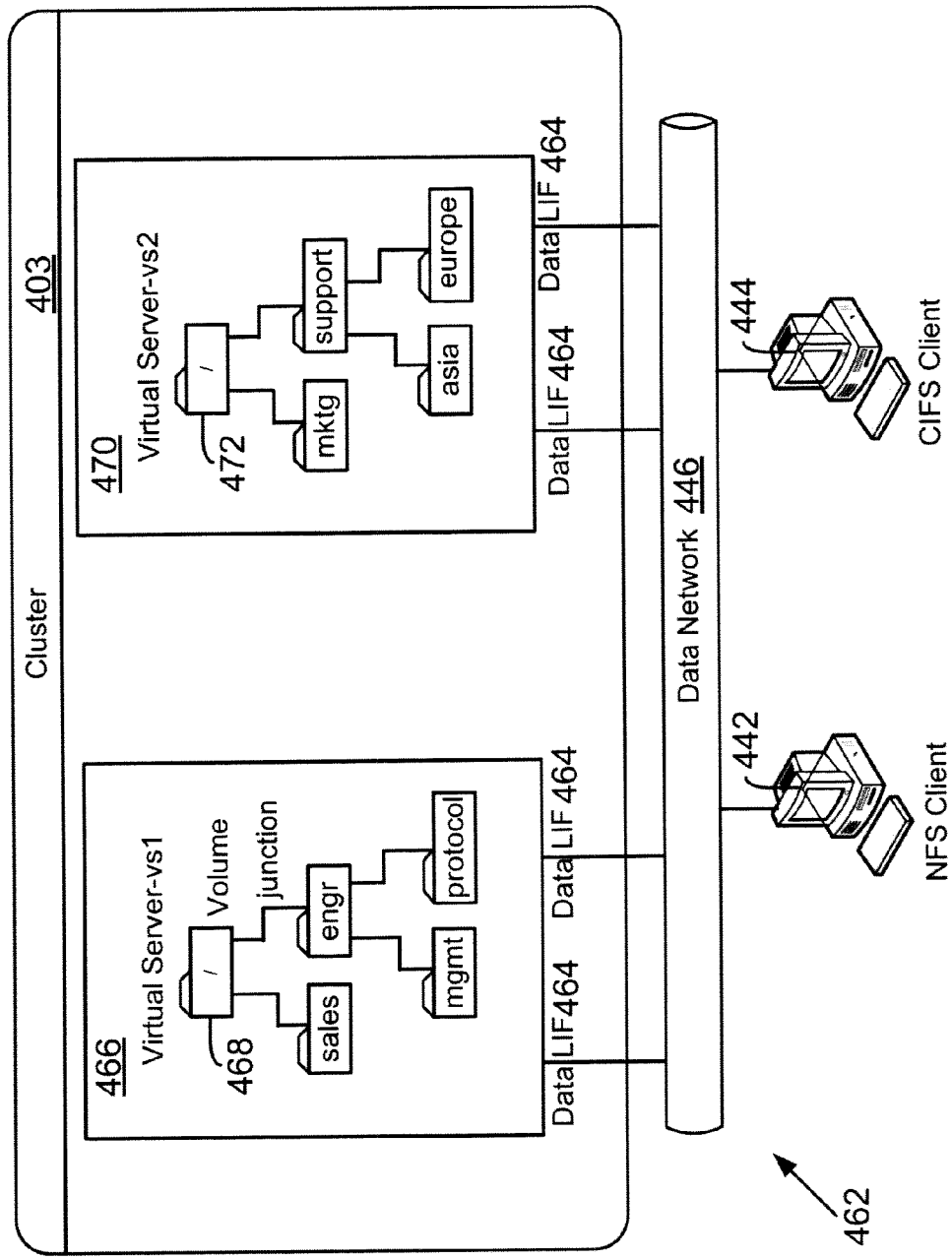
Figure 4D:
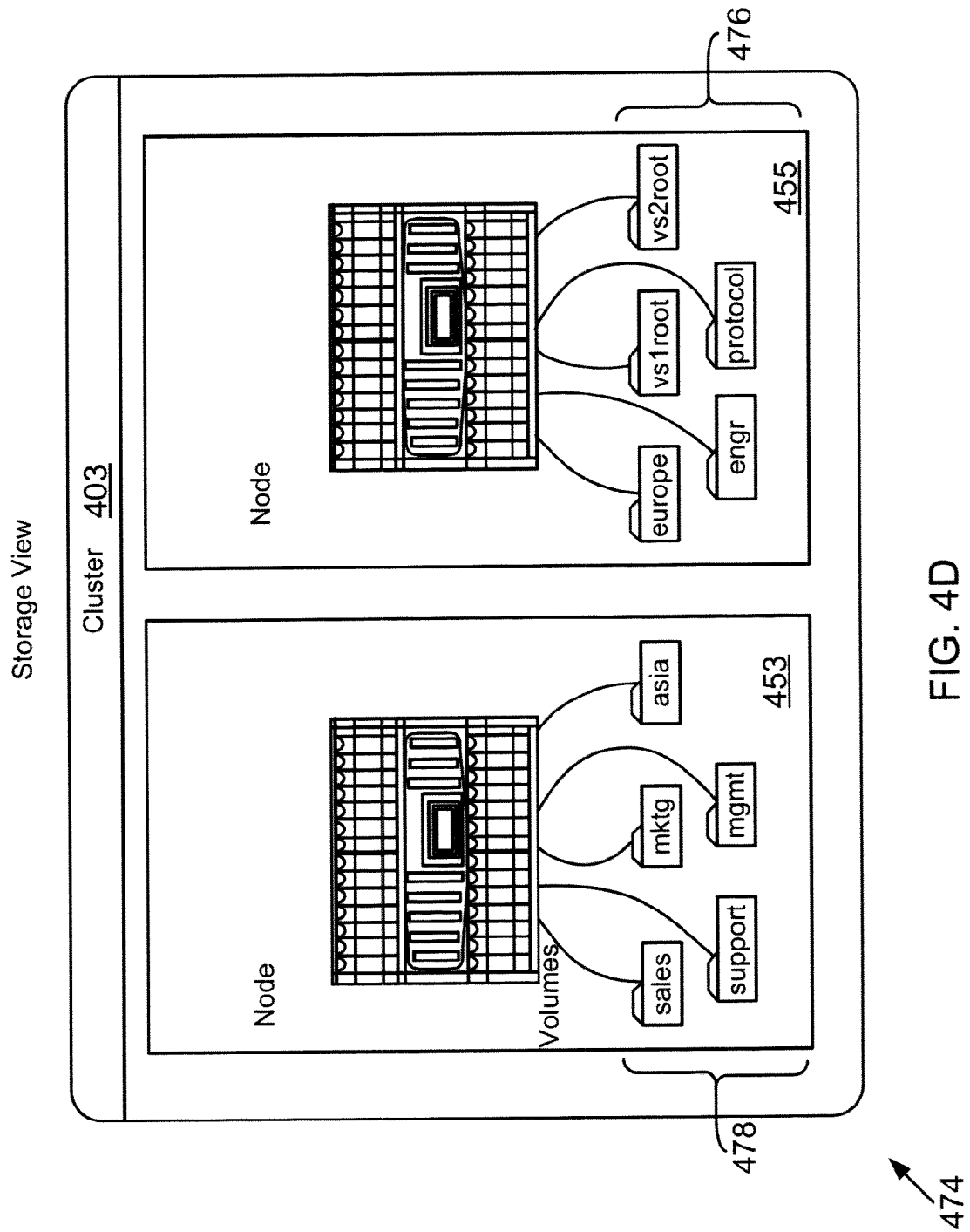

In one embodiment, using layout 400, management application 118 is able to provide a comprehensive and integrated view of the entire storage environment 200 with both cluster based and non-cluster based storage systems. For example, a storage administrator may be able to view all the volumes in a storage environment using a single module, for example, management application 118. Management application 118 is also able to present just a physical view (for example, as shown in FIG. 4B), a logical view (for example, as shown in FIG. 4C) and a storage view (for example, as shown in FIG. 4D) of the storage environment as described below.

For presenting the different views of different system types, Operations Manager 124 categorizes components used by storage system 108 and cluster system 202 as data structures/objects. Operations Manager 124 recognizes components that may be commonly used by both the storage system 108 and cluster system 202 (referred to as shared components or "existing components"). The shared components may include disks, RAID groups, aggregates, volumes and qtrees. These may be presented to the storage administrator, as they typically would have been presented for only storage system 108.

Operations Manager 124 also recognizes components that may only be used in one of the systems, i.e. either the storage system 108 or cluster system 202 (may be referred to as non-shared or "new" components). The components that may be different (i.e. not used by a typical monolithic storage system 108) are a cluster, virtual server and a global namespace.

Operations Manager 124 manages the relationships between the shared components and non-shared components to provide the various views to a storage administrator. As described below, because of layout 400, a user is provided with an option to view the entire storage environment with both types of storage systems, 108 and 202, only storage system 108 and only cluster system 202.

Referring back to FIG. 4A, Operations Manager 124 generates the plurality of data structures (or objects) to represent the various components of storage environment 202. Operations Manager 124 maintains a hierarchical structure for storing information regarding both the cluster based and non-cluster based storage systems. For example, Operations Manager 124 maintains a top-level data structure labeled as appliance 402 for representing and storing information regarding a typical monolithic storage system 108. A second and separate data structure, labeled as cluster 404, may be used to represent and store information regarding cluster based system 202.

Both appliance 402 and cluster 404 are associated to a data structure labeled node 406 that may be used to provide a global view of storage environment 200. Node 406 maintains relationships between various physical and logical components of storage environment 200 as described below in detail.

Layout 400 includes a data structure labeled as disk 414 that may be used to represent physical storage space in a non-cluster based system (for example, 108). The information regarding the physical storage may be obtained by Operation Manager 124 by polling, sending information requests to the non-cluster based system 108 or by any other means.

The data structure 414 may be associated with a data structure labeled as aggregate 410 that is used to store information regarding aggregates within storage environment 200. Aggregate 410 is associated with a plurality of other data structures, for example, a data structure labeled as flexible volume 418, and a data structure labeled as member aggregate 432. In this example, flexible volume 418 may be used to store information regarding flexible volumes used by a non-cluster based storage system. Member aggregates 432 may be used to store information regarding one or more member aggregates of a cluster based system.

If a user wants to obtain details regarding flexible volumes in a non-cluster based system represented by 402, then Operations Manager 124 simply has to toggle from data structure 402 to node 406 and retrieve aggregate information from data structure 410 for the non-cluster based storage system. From aggregate 410, the flexible volume information may be obtained from data structure 418. If a user request is to view a member aggregate within a cluster based system then Operations Manager 404 toggles from data structure 404 to node 406 to obtain information from member aggregate 432.

Operations Manager 124 collects volume information from both the cluster based and non-cluster based storage systems. The information is stored in a data structure labeled as member volume 422. Operations Manager 124 also maintains information regarding striped volumes in a data structure labeled striped volume 420.

A member volume may be associated with a flexible volume as shown by the connection between 422 and 418. A member volume may also be associated with a member aggregate, shown by the connection between 422 and 432. A member volume may be associated with a striped volume, as shown by the connection between 422 and 420.

Operations Manager 124 maintains information regarding all the member aggregates within 432. The member aggregates may be a part of a striped aggregate whose information is stored in data structure 434. The striped aggregate may be a part of a cluster, as shown by the relationship between 434 and 404.

If a user wants information on all the member volumes of a storage environment 200, then Operations Manager 124 is able to obtain that information from data structure 422. If the user seeks striped aggregate information and member aggregate information for a particular cluster system, then that can be obtained from data structures 434 and 432, respectively.

A cluster based system may include various virtual servers. Information regarding the virtual servers may be stored as data structure 416. This information is again populated by Operations Manager 124 by communicating with the cluster based storage system.

Virtual servers may include flexible volumes, as shown by the connection between 416 and 418 and striped volumes, shown by the connection between 420 and 416. The virtual server data structure 416 may also be associated directly with data structure 404. This allows a user to view all virtual servers that are a part of a particular cluster.

Operations Manager 124 also maintains information regarding all the physical ports that are used in a storage environment. This is shown as data structure 408 that includes information regarding all the individual ports. The individual port information is stored in a data structure labeled port 412. Port 412 is connected to port aggregate 408 and also directly to node 406.

If a user wants to know details regarding a particular port, then management application 118 is able to present that information because Operations Manager 124 is able to toggle from 404 to node 406 and then to port aggregate 408 or directly to port 412.

The physical ports of a storage environment may be actual device ports that may be associated with various logical components. The logical components may be grouped together within a data structure 430 that includes information regarding various logical components shown as data logical interface (Data LIF) 424, cluster logical interface (Cluster LIF) 426 and management logical interface (Mgmt LIF) 428. Data LIF 424 may be a data structure that may be used to store an Internet Protocol address (IP address) used by a client to access a cluster to read and write data. Cluster LIF 426 may be used to store information regarding a cluster node that is used communicate with other cluster nodes. Mgmt LIF 428 may be used to store information regarding a management node that is used by a management console to communicate with a cluster.

Logical interface 430 is associated with physical port 412 that is associated with port aggregate 408 and node 406, as discussed above. Because of the relationships between the logical and physical components, one can toggle between a logical view and a physical view and vice-versa. For example, management application 118 is able to provide details regarding a physical port and the associated logical components because of the relationship between 424, 426, 428 to logical interface 430 and the relationship between logical interface 430 and port 412.

Since Operations Manager 124 maintains the various relationships between various components of a monolithic system represented by 402 and a cluster based system 404, a plurality of views are efficiently provided to a user. The description below provides some examples of how both physical and logical components may be viewed from a user's perspective.

FIG. 4B shows a physical view 440 for a cluster 403 (similar to cluster 202) that is represented by data structure 404 in FIG. 4A. Cluster 403 may have two nodes 453 and 455 (similar to the nodes described above with respect to FIG. 2). Node 453 may include a data port 454 that is used by clients 442 and 444 to access cluster 403 via a data network 446. Management port 455 may be used by a management console 448 to access cluster 403 via a management network 450. Cluster port 451 may be used by node 453 to communicate with node 455 via a cluster network (also referred to as "cluster interconnect") 459.

Node 455 may also include a data port 458, a management port 460 and a cluster port 457. The functionality of ports 458, 460 and 457 is similar to ports 454, 456 and 451, respectively.

The physical view 440 allows a user to view the various ports and their properties. The physical view is generated based on the layout 400, described above with respect to FIG. 4A. A storage administrator using computing system 448 is able to troubleshoot and view any problems ports within a storage environment.

FIG. 4C shows an example of a logical view 462 for cluster 403. Logical view 462 shows that cluster 403 may have a plurality of virtual servers 466 and 470. Each virtual server 466 and 470 may be associated with a plurality of volumes accessible using namespace 468 and 472. Namespace 468 shows the relationship of the various volumes, labeled "sales", "engr", "mgmt" and "protocol". Namespace 472 shows volumes labeled "mktg", "support", "asia" and "europe". The labels may be used to show different departments, for example, sales, engineering (engr), marketing (mktg), management (mgmt) and physical locates of the business units, for example, Asia and Europe. The volumes for one virtual server may be associated with different nodes 453 and 455 of FIG. 4B.

The logical view 462 also shows the Data LIF 464 used by clients 442 and 444 to access virtual servers 466 and 470. The Data LIF may be IP addresses that are used by the clients to access the virtual servers via the data network 446. The user is able to toggle between physical view 440 and logical view 462 because of layout 400 and the various relationships shown in FIG. 4A that are created and maintained by Operations Manager 124.

FIG. 4D shows an example of a storage view 474 for cluster 403. The storage view provides information regarding the various volumes 476 and 478 that are associated with nodes 453 and 455, respectively. The storage view 474 is also made possible because of layout 400, described above.

Figure 4E:
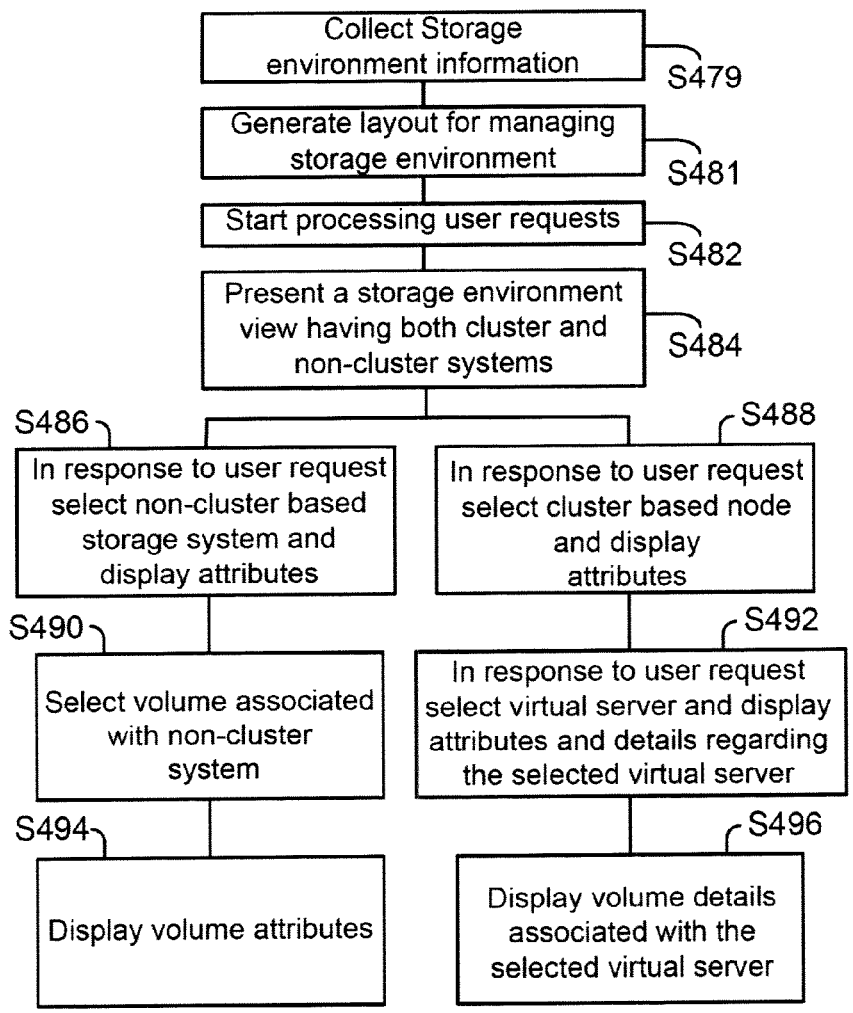
FIGS. 4E and 4F show process flow diagrams, according to the various embodiments of the present disclosure.

Process Flow:

FIG. 4E shows a process flow diagram 480 for generating and using layout 400 (FIG. 4A) in a storage environment 200 having both clustered and non-clustered storage systems. The process begins in block S479 when information regarding various storage environment components is collected by Operations Manager 124. The information may be collected by using management console 120 (FIG. 1A) via a management port.

In block S481, a layout having a plurality of data structures for storing the collected information is generated. The layout may be similar to layout 400 that is described above in detail with respect to FIG. 4A.

Once the layout is generated, the process for using layout 482 begins in block S482, when an authorized storage administrator using management application 118 (i.e. Operations Manager 124) logs in. The login procedure ensures that only authorized individual/entities are allowed to access information regarding storage environment 200.

After administrator login, in block S484, in response to a client request, management application 118 presents a "complete" (or "global") view of storage environment 200. The term complete here means both clustered and non-clustered systems.

In response to the client request, management application 118 retrieves the data structures of layout 400 to present the integrated view. The view is made possible because of layout 400 that uses node 406 for both appliance 402 and cluster 404, described above in detail. The integrated view may be presented by executing programmable instructions out of memory and then displaying the results on a display device (not shown).

Figure 5E:
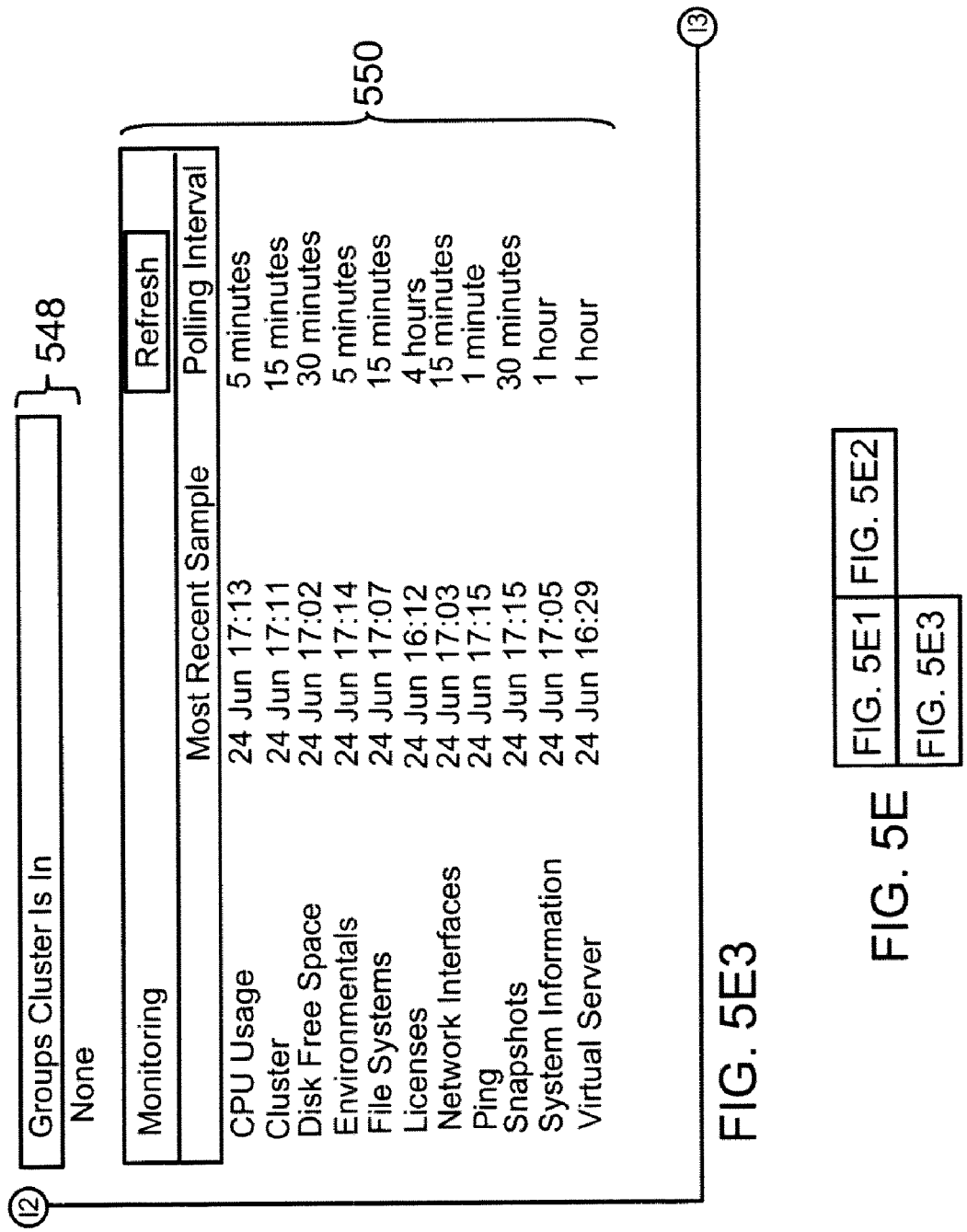

An example of an integrated view is shown in window 500 of FIG. 5A that is displayed on a display device for a storage administrator. In window 500, each storage system is referred to as a "storage controller".

For managing storage environment 200, window 500 includes various selectable options including icons, drop down menu options or others. Window 500 may provide options 505 and 502 from where one can obtain a global view of the storage environment 200. After selecting option 505 and 502, a user, for example, a storage administrator may obtain a global view of storage environment 200 that includes all the storage systems in the storage environment 200. One can select option 501 to obtain a status on various group components of storage environment 200, while option 503 allows one to see details of a member of a group. Details regarding the various systems are available within the same user interface, as described below.

Window 500 provides a list of all storage systems in column 508. Column 504 shows the "type" of storage system and the status of each storage system is shown in column 506. The status column 506 indicates whether a storage system is fully operational, if there are any errors, or if it is offline (i.e. non-operational). Column 510 identifies if a storage system (or a node) is a part of a cluster (for example, 511). If there is no indication in column 510 of a cluster, then the storage system is assumed to be a non-cluster storage system (for example, 513). Column 512 shows a model number of each storage system and column 514 shows a serial number for each storage system.

The view in window 500 is made possible because of layout 400 that is described above with respect to FIG. 4A.

From window 500, a user may request information for a non-cluster based system, for example, 513, or a cluster based system 511. This is shown as blocks S486 and S488 in FIG. 4E.

In block S486, the user selects the non-cluster system (513). Management application 118 using layout 400 (for example, 402, 406 and others) retrieves information regarding non-cluster system 513. The information is displayed in window 516 shown in FIG. 5B. Window 516 provides information regarding the selected system. For example, in segment 518 of window 516, the user can see the status, Model number, serial number, the primary IP address, the operating system, protocols used by the selected system, the network interface, whether remote management is available and a location. Segment 518 also shows overall usage of one or more CPUs used by the selected storage system.

Segment 520 in window 516 provides an event history involving the selected storage system. Segment 522 provides information regarding the storage space that is available for the selected system. For example, segment 522 shows how many data disks, parity disks, spare disks and total number of disks are available. Segment 522 also shows the number of aggregates, Volumes, qtree and LUNs that are being used by the selected storage system.

Referring back to FIG. 4E, in block S490, a user may select a volume associated with the selected storage system. For example, a user may select a volume from segment 522 of window 516. Management application 118 retrieves volume information using layout 400 (for example, 422, 418, 410 and others) and displays the attributes for the selected volume.

FIG. 5C shows details of the selected volume in window 524. Information regarding the selected volume may be shown in one or more segments in block S494. For example, segment 526 shows the status, which storage system is serving the volume, identification of an aggregate, if the volume is a part of an aggregate, the type of volume, the RAID configuration, capacity used, total volume size and a graphical window showing volume capacity used versus the total available capacity.

Segment 528 shows an event history for the volume. Segment 530 shows more information about the volume, for example, storage capacity (Qtrees and LUNS), any related storage and also identifies groups if the selected volume is used by a group. This information allows the Operations Manger 124 to collect group based information that is described below in detail.

After the user is presented with a comprehensive view in block S484, the user may request information regarding a cluster system node in block S488. Management application 118 retrieves information for the cluster system node by using layout 400 (for example, data structure 404, 406 and others). Based on user request/selection, cluster node details are shown in window 532 of FIG. 5D. Window 532 is based on the user selecting cluster based storage system 511 from FIG. 5A.

Window 532 includes information about the selected system. For example, segment 534 of window 532 shows the status, Model Number, Serial number, primary address, operating system, cluster name and a number of network interface (i.e. number of available network interface, for example, data, management, storage and cluster interface). CPU usage for the selected cluster node may also be shown within segment 534.

Segment 536 shows storage capacity, i.e. aggregates and volumes and an event history for the node. Segment 536 may also show if the selected node is a part any group.

From window 532, a user may select the cluster shown in segment 534. The cluster details are then displayed in window 537 of FIG. 5E. Window 537 may include different segments displaying different type of information for the selected cluster. For example, segment 540 shows the status, serial number, primary IP address, the number of nodes (or controllers) in the cluster, the number of virtual servers, number of actual ports and the number of logical interfaces (see FIG. 4A). The volume capacity for the selected cluster is shown in segment 542.

Segment 538 shows the cluster hierarchy which may include the identity of the nodes, the number of logical interfaces for the cluster itself, drill down details of the virtual servers that are configured in the cluster and information regarding stripped aggregates for the cluster.

The event history is shown in segment 544 and storage capacity is shown in segment 546. Segment 548 provides group information for the cluster. The indication "None" means that the cluster is not a part of any defined group. Segment 550 is a monitoring window showing cluster usage and CPU usage.

From segment 538, the user may select a virtual server, as shown in block S492 of FIG. 4E. Management application 118 retrieves details for the selected virtual server by using layout 400 (for example, data structure 416). This displays details regarding the selected virtual server in a window 562 of FIG. 5F. Window 562 includes segment 564 that provides top level details for the virtual server, for example, status, cluster, primary IP address, NIS domain, the root volume and number of logical interfaces.

The namespace for the selected virtual system is shown in segment 566. Segment 570 shows the total volume capacity used as compared to the total available volume capacity for the virtual server.

Segment 568 provides event history for the virtual server, total storage capacity, associated groups, if any. Monitoring information for the virtual server is also provided in segment 568.

In block S496, a user may select and view volume details associated with the selected virtual server as shown in window 571 of FIG. 5G. Management application 118 retrieves details regarding the selected volume from layout 400 (for example, 422, 420, 432 and 434). Window 571 shows volume details in segment 572. For example, segment 572 includes status information, identity of the node managing the volume, a junction path, and identity of an aggregate, type of volume, RAID configuration, capacity used and volume size.

Segment 588 provides a graphical illustration of the volume capacity used versus the total available capacity. Segment 584 and 586 includes more details about the selected volume. For example, segment 584 provides the space breakout for the volume, the number of Snapshots taken for the volume, as well as any related storage. Segment 586 also provides event history involving the selected volume and information regarding any associated groups.

As shown with respect to FIGS. 4A-4E and 5A-5G, one can get a complete view of the storage environ, drill down and see details for a node in a cluster system, view virtual server namespace details, toggle between logical and physical components and view details regarding a monolithic storage systems as well. This assists a storage administrator to efficiently manage a storage environment with different storage system types.

Figure 4F:
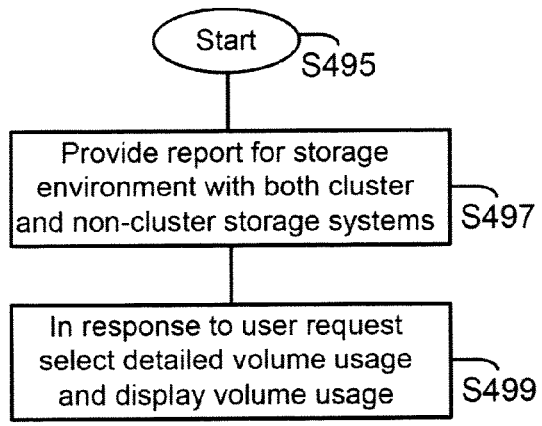

Group Usage:

Layout 400 described above with respect to FIG. 4A allows Operations Manager 124 to collect information regarding various volumes in a storage environment. For monitoring storage system usage, a storage administrator may create specific groups based on project teams, divisions, locations, business units and others. The storage administrator may then assign certain volumes to these different groups. In one embodiment, Operations Manager 124 is able to collect volume usage information and is able to allocate cost (may also be referred to as "charge backs") among these different groups. FIG. 4F shows a process flow diagram for reporting charge back among different groups. The charge backs are for both clustered and non-clustered storage systems. The process begins in block S495.

In block S497, the user is provided with a comprehensive chargeback view in window 585 of FIG. 5H. One can reach window 585 by selecting option 581 from the "Global" option 505 (FIG. 5A). Window 585 includes a chargeback icon 587 that shows the total charge for using a storage system within a certain period. Window 585 also shows average usage and the rate of usage for example per gigabytes.

In block S499, a user may want to see a detailed report for different volumes. The detailed report is shown in window 590 of FIG. 5I. Window 590 includes various columns including column 592 that lists all the volumes; column 594 that lists the storage systems/nodes associated with the volumes and column 596 shows the average usage of the volumes. Column 598 shows the annual rate of usage, while monthly usage is shown in column 599. The usage is for defined periods that may be set by a storage administrator.

Figure 6A:
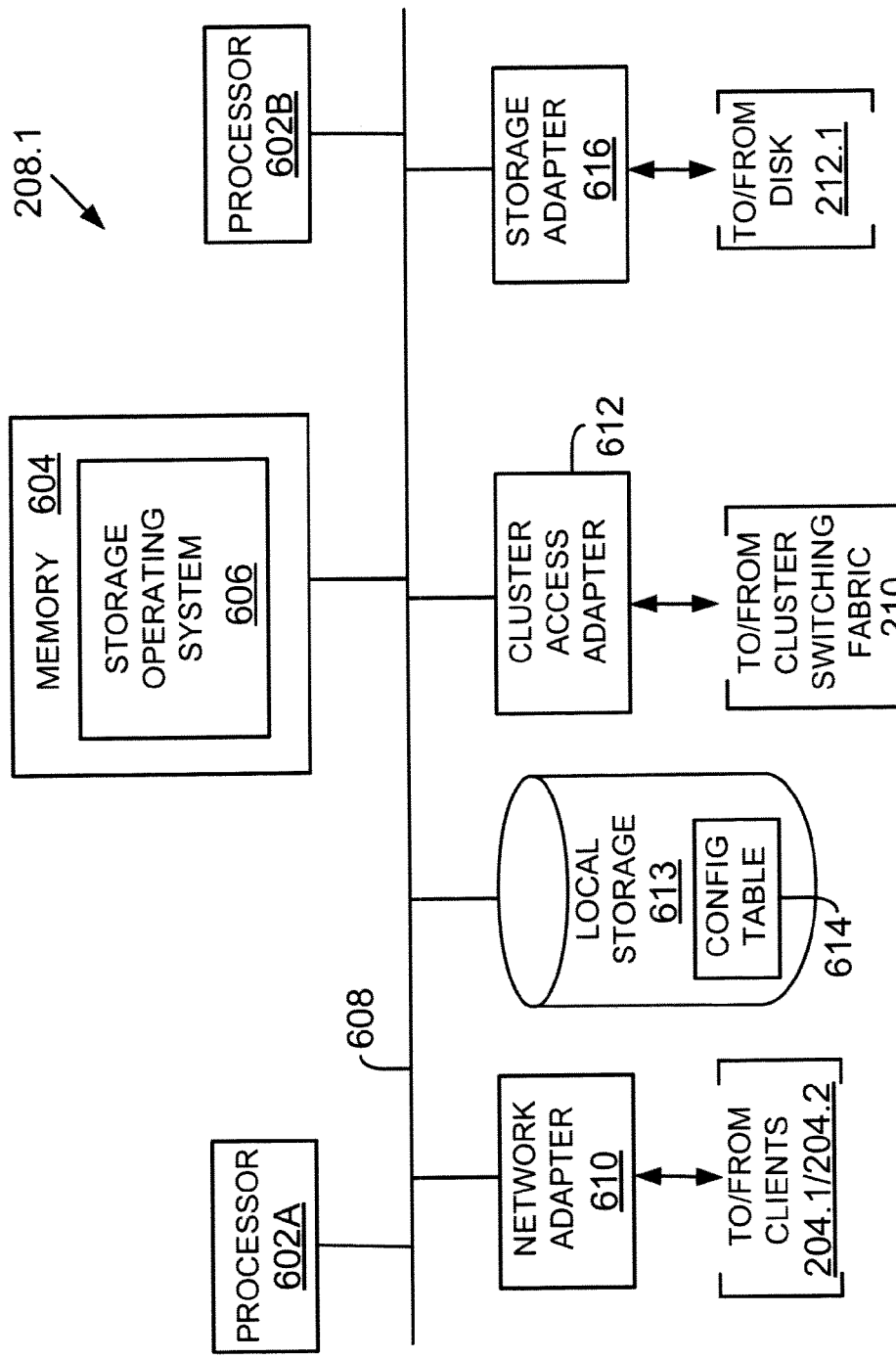
FIG. 6A shows an example of a node used in a cluster system, according to one embodiment.

Storage System Node:

FIG. 6A is a block diagram of a node 208.1 (FIG. 2) that is illustratively embodied as a storage system comprising of a plurality of processors 602A and 602B, a memory 604, a network adapter 610, a cluster access adapter 612, a storage adapter 616 and local storage 613 interconnected by a system bus 608. The local storage 613 comprises one or more storage devices, such as disks, utilized by the node to locally store configuration information (e.g., in a configuration table 614).

The cluster access adapter 612 comprises a plurality of ports adapted to couple node 208.1 to other nodes of cluster 202. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 612 is utilized by the N/D-module for communicating with other N/D-modules in the cluster 202.

Each node 208.1 is illustratively embodied as a dual processor storage system executing a storage operating system 606 that preferably implements a high-level module, such as a file system, to logically organize the information as a hierarchical structure of named directories, files and special types of files called virtual disks (hereinafter generally "blocks") on disks 212.1. However, it will be apparent to those of ordinary skill in the art that the node 208.1 may alternatively comprise a single or more than two processor systems. Illustratively, one processor 602A executes the functions of the N-module 214.1 on the node, while the other processor 602B executes the functions of the D-module 216.1.

The memory 604 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 606, portions of which is typically resident in memory and executed by the processing elements, functionally organizes the node 208.1 by, inter alia, invoking storage operations in support the storage service implemented by the node. An example of operating system 606 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 610 comprises a plurality of ports adapted to couple the node 208.1 to one or more clients 204.1/204.2 over point-to-point links, wide area networks, virtual private networks implemented over a public network (Internet) or a shared local area network. The network adapter 610 thus may comprise the mechanical, electrical and signaling circuitry needed to connect the node to the network. Illustratively, the computer network 112 may be embodied as an Ethernet network or a Fibre Channel (FC) network. Each client 204.1/204.2 may communicate with the node over network 112 by exchanging discrete frames or packets of data according to pre-defined protocols, such as TCP/IP.

The storage adapter 616 cooperates with the storage operating system 606 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 212.1. The storage adapter 616 comprises a plurality of ports having input/output (I/O) interface circuitry that couples to the disks over an I/O interconnect arrangement, such as a conventional high-performance, FC link topology.

Storage of information on each array 212.1 is preferably implemented as one or more storage "volumes" that comprise a collection of physical storage disks 212.1 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example RAID implementation is a RAID-4 level implementation, although it should be understood that other types and levels of RAID implementations may be used in accordance with the inventive principles described herein.

Figure 6B:
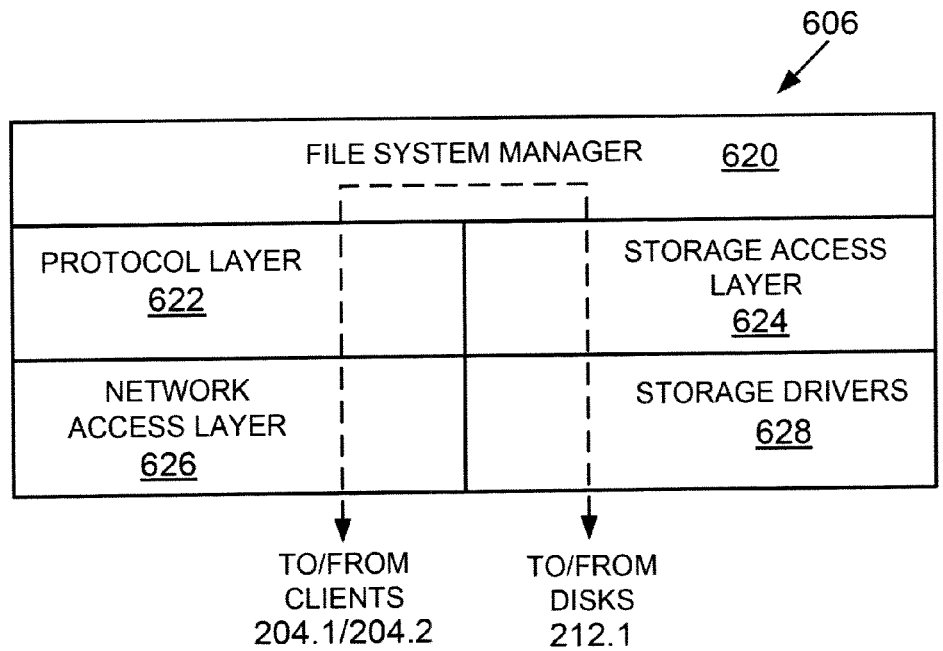
FIG. 6B shows an example of a storage operating system, used according to one embodiment.

Operating System:

FIG. 6B illustrates a generic example of operating system 606 executed by node 208.1, according to one embodiment of the present disclosure. In one example, operating system 606 may include several modules, or "layers" executed by one or both of N-Module 214.1 and D-Module 216.1. These layers include a file system manager 620 that keeps track of a directory structure (hierarchy) of the data stored in storage devices and manages read/write operations, i.e. executes read/write operations on disks in response to client 204.1/204.2 requests.

Operating system 606 may also include a protocol layer 622 and an associated network access layer 626, to allow node 208.1 to communicate over a network with other systems, such as clients 204.1/204.2. Protocol layer 622 may implement one or more of various higher-level network protocols, such as NFS, CIFS, Hypertext Transfer Protocol (HTTP), TCP/IP and others, as described below.

Network access layer 626 may include one or more drivers, which implement one or more lower-level protocols to communicate over the network, such as Ethernet. Interactions between clients 204.1/204.2 and mass storage devices 212.1 (e.g. disks, etc.) are illustrated schematically as a path, which illustrates the flow of data through operating system 606.

The operating system 606 may also include a storage access layer 624 and an associated storage driver layer 628 to allow D-module 216.1 to communicate with a storage device. The storage access layer 624 may implement a higher-level disk storage protocol, such as RAID (redundant array of inexpensive disks), while the storage driver layer 628 may implement a lower-level storage device access protocol, such as FC or SCSI. In one embodiment, the storage access layer 624 may implement the RAID protocol, such as RAID-4 or RAID-DP™ (RAID double parity for data protection provided by NetApp Inc. the assignee of the present disclosure).

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 7:
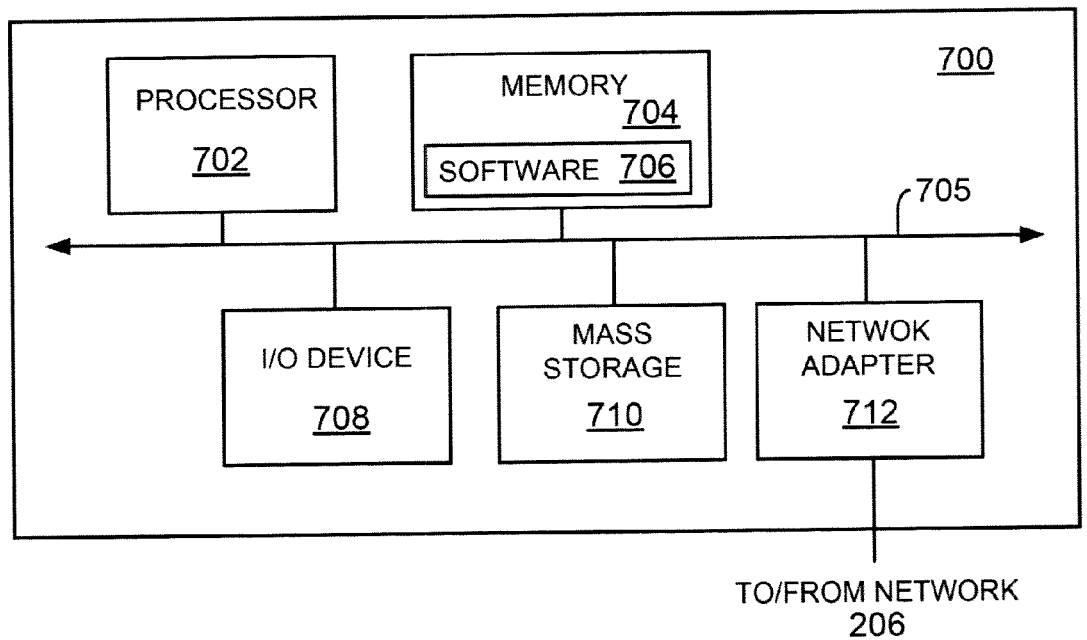
FIG. 7 shows an example of a computing system implementing the process steps of the present disclosure.

Processing System:

FIG. 7 is a high-level block diagram showing an example of the architecture of a processing system, at a high level, in which the executable instructions described above can be implemented. The processing system 700 can represent management console 118, for example. Note that certain standard and well-known components which are not germane to the present invention are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain embodiments, the processors 702 accomplish this by executing executable instructions 706 stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the techniques introduced above (e.g., the storage management application 118 in FIG. 1B) may reside in and executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers 202) over a network and may be, for example, an Ethernet adapter, a Fibre Channel adapter, or the like. The processing system 700 also includes one or more input/output (I/O) devices 708 coupled to the bus system 705. The I/O devices 708 may include, for example, a display device, a keyboard, a mouse, etc.

Thus, a method and apparatus for managing clustered and non-clustered storage systems have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for a storage environment having a cluster based storage system and a non-cluster based storage system, comprising:
   (a) collecting information regarding a plurality of components including physical components and logical components of both the cluster based storage system and the non-cluster based storage system; wherein the cluster based storage system includes a plurality of nodes, each node executing a network module for interfacing with other network modules and client computing systems, a storage module for managing storage space at storage devices in a distributed architecture used for storing information for the client computing systems, and the non-cluster based storage system includes a storage server having access to a dedicated storage subsystem for storing information for the client computing systems;
   (b) generating a hierarchical layout having a plurality of data structures for storing information regarding the plurality of components of both the cluster based storage system and the non-cluster based storage system and maintaining relationships between shared and non-shared components of the cluster based storage system and the non-cluster based storage system for selectably presenting information regarding the physical and logical components of only the cluster based storage system, of only the non-cluster based storage system and for both the cluster based storage system and the non-cluster based storage system; wherein a shared component includes a storage device and a non-shared component includes a global namespace used by the plurality of nodes of the cluster based storage system for accessing storage space;
   (c) receiving a client request for information regarding a component of the storage environment;
   (d) retrieving a data structure associated with the component of the storage environment; and
   (e) presenting information regarding the component in response to the client request.

2. The method of claim 1, further comprising:
   using the layout for presenting an integrated view of the storage environment on a display device with selectable options for selecting the cluster based storage system components and the non-cluster based storage system components;
   receiving a request for selecting the cluster based storage system; and
   displaying components and attributes of the cluster based storage system from the integrated view.

3. The method of claim 2, further comprising:
   receiving a request for selecting a virtual server from a list of plurality of virtual servers associated with the selected cluster based storage system; and
   displaying attributes for the selected virtual server.

4. The method of claim 2, further comprising:
   receiving a request for selecting the non-cluster based storage system from the integrated view; and
   displaying attributes of the selected non-cluster based storage system.

5. The method of claim 1, wherein the layout is generated by a management application that maintains relationships between a plurality of physical components and a plurality of logical components for the cluster based storage system and the non-cluster based storage system.

6. The method of claim 5, wherein a user is provided with a selectable option to view the physical components and the logical components of the cluster based storage system and the non-cluster based storage system.

7. The method of claim 1, wherein a management application segregates users of both the cluster based storage system and the non-cluster based storage system into different groups.

8. The method of claim 7, wherein the management application presents a group wise usage of the cluster based storage system and the non-cluster based storage system.

9. A non-transitory machine readable storage medium storing executable instructions, which when executed by a machine, causes the machine to manage a storage environment having a cluster based storage system and a non-cluster based storage system, the method comprising:
   (a) collecting information regarding a plurality of components including physical components and logical components of both the cluster based storage system and the non-cluster based storage system; wherein the cluster based storage system includes a plurality of nodes, each node executing a network module for interfacing with other network modules and client computing systems, a storage module for managing storage space at storage devices in a distributed architecture used for storing information for the client computing systems, and the non-cluster based storage system includes a storage server having access to a dedicated storage subsystem for storing information for the client computing systems;
   (b) generating a hierarchical layout having a plurality of data structures for storing information regarding the plurality of components of both the cluster based storage system and the non-cluster based storage system and maintaining relationships between shared and non-shared components of the cluster based storage system and the non-cluster based storage system for selectably presenting information regarding the physical and logical components of only the cluster based storage system, of only the non-cluster based storage system and for both the cluster based storage system and the non-cluster based storage system; wherein a shared component includes a storage device and a non-shared component includes a global namespace used by the plurality of nodes of the cluster based storage system for accessing storage space;
   (c) receiving a client request for information regarding a component of the storage environment;
   (d) retrieving a data structure associated with the component of the storage environment; and
   (e) presenting information regarding the component in response to the client request.

10. The storage medium of claim 9, wherein using the layout, an integrated view of the storage environment is presented on a display device with selectable options for selecting the cluster based storage system components and the non-cluster based storage system components; and when the cluster based storage system is selected in response to a user request, components and attributes of the cluster based storage system are displayed to the user.

11. The storage medium of claim 10, wherein in response to a request, a virtual server from a list of plurality of virtual servers associated with the selected cluster based storage system is selected; and attributes for the selected virtual server are displayed.

12. The storage medium of claim 10, wherein a management application generates the layout by maintaining relationships between a plurality of physical components and a plurality of logical components for both the cluster based storage system and the non-cluster based storage system.

13. The storage medium of claim 10, wherein in response to a request, the non-cluster based storage system is selected from the integrated view; and attributes of the selected non-cluster based storage system are displayed.

14. The storage medium of claim 10, wherein a user is provided with a selectable option to view the physical components and the logical components of the cluster based storage system and the non-cluster based storage system.

15. The storage medium of claim 9, wherein a management application segregates users of both the cluster based storage system and the non-cluster based storage system into different groups.

16. The storage medium of claim 15, wherein the management application presents a group wise usage of the cluster based storage system and the non-cluster based storage system.

17. A computer program product comprising:
   a non-transitory computer usable storage medium having computer readable instructions embodied therein for managing a storage environment having a cluster based storage system and a non-cluster based storage system, comprising:
   (a) instructions for collecting information regarding a plurality of components including physical components and logical components of both the cluster based storage system and the non-cluster based storage system; wherein the cluster based storage system includes a plurality of nodes, each node executing a network module for interfacing with other network modules and client computing systems, a storage module for managing storage space at storage devices in a distributed architecture used for storing information for the client computing systems, and the non-cluster based storage system includes a storage server having access to a dedicated storage subsystem for storing information for the client computing systems;
   (b) instructions for generating a hierarchical layout having a plurality of data structures for storing information regarding the plurality of components of both the cluster based storage system and the non-cluster based storage system and maintaining relationships between shared and non-shared components of the cluster based storage system and the non-cluster based storage system for selectably presenting information regarding the physical and logical components of only the cluster based storage system, of only the non-cluster based storage system and for both the cluster based storage system and the non-cluster based storage system; wherein a shared component includes a storage device and a non-shared component includes a global namespace used by the plurality of nodes of the cluster based storage system for accessing storage space;
   (c) instructions for receiving a client request for information regarding a component of the storage environment;

(d) instructions for retrieving a data structure associated with the component of the storage environment; and
(e) instructions for presenting information regarding the component in response to the client request.

18. The computer program product of claim 17, further comprising:
instructions for using the layout for presenting an integrated view of the storage environment on a display device with selectable options for selecting the cluster based storage system components and the non-cluster based storage system components;
instructions for receiving a request for selecting the cluster based storage system; and
instructions for displaying components and attributes of the cluster based storage system from the integrated view.

19. The computer program product of claim 18, further comprising:
instructions for receiving a request for selecting a virtual server from a list of plurality of virtual servers associated with the selected cluster based storage system; and
instructions for displaying attributes for the selected virtual server.

20. The computer program product of claim 18, further comprising:
instructions for receiving a request for selecting the non-cluster based storage system from the integrated view; and
instructions for displaying attributes of the selected non-cluster based storage system wherein.

21. The computer program product of claim 18, wherein the layout is generated by a management application that maintains relationships between a plurality of physical components and a plurality of logical components for the cluster based storage system and the non-cluster based storage system.

22. The computer program product of claim 21, wherein a user is provided with a selectable option to view the physical components and the logical components of the cluster based storage system and the non-cluster based storage system.

23. The computer program product of claim 17, wherein a management application segregates users of both the cluster based storage system and the non-cluster based storage system into different groups.

24. The computer program product of claim 23, wherein the management application presents a group wise usage of the cluster based storage system and the non-cluster based storage system.

25. A machine implemented method for managing a storage environment having a cluster based storage system and a non-cluster based storage system, comprising:

(a) generating a hierarchical layout having a plurality of data structures, the plurality of data structures storing information regarding a plurality of components including physical components and logical components of the cluster based storage system and the non-cluster based storage system and maintaining relationships between shared and non-shared components of the cluster based storage system and the non-cluster based storage system for selectably presenting information regarding the physical and logical components of only the cluster based storage system, of only the non-cluster based storage system and for both the cluster based storage system and the non-cluster based storage system;
wherein the cluster based storage system includes a plurality of nodes, each node executing a network module for interfacing with other network modules and client computing systems, a storage module for managing storage space at storage devices in a distributed architecture used for storing information for the client computing systems, the non-cluster based storage system includes a storage server having access to a dedicated storage subsystem for storing information for the client computing systems, and wherein a shared component includes a storage device and a non-shared component includes a global namespace used by the plurality of nodes of the cluster based storage system for accessing storage space; and
(b) using the layout for presenting an integrated view of the storage environment on a display device with selectable options for selecting the cluster based storage system components and the non-cluster based storage system components.

26. The method of claim 25, further comprising:
selecting the cluster based storage system; and
displaying components and attributes of the cluster based storage system from the integrated view.

27. The method of claim 25, further comprising:
selecting the non-cluster based storage system from the integrated view; and
displaying attributes of the non-cluster based storage system.

28. The method of claim 25, wherein a management application segregates users of both the cluster based storage system and the non-cluster based storage system into different groups.

29. The method of claim 28, wherein the management application presents a group wise usage of the cluster based storage system and the non-cluster based storage system.

* * * * *